(12) United States Patent
Kittaka

(10) Patent No.: US 6,577,790 B2
(45) Date of Patent: Jun. 10, 2003

(54) OPTICAL DEVICE WITH OPTICAL FIBERS AND ROD LENSES

(75) Inventor: Shigeo Kittaka, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 137 days.

(21) Appl. No.: 09/759,903

(22) Filed: Jan. 12, 2001

(65) Prior Publication Data

US 2001/0017961 A1 Aug. 30, 2001

(30) Foreign Application Priority Data

Jan. 21, 2000 (JP) ........................................ 2000-013041

(51) Int. Cl.[7] ................................................ G02B 6/32
(52) U.S. Cl. ......................................... 385/34; 385/124
(58) Field of Search ........................... 385/34, 124, 123, 385/21

(56) References Cited

U.S. PATENT DOCUMENTS 4,239,330 A * 12/1980 Ashkin et al. ................. 385/21
5,469,277 A * 11/1995 Kavehrad et al. ............ 359/130
5,689,359 A * 11/1997 Kurata et al. ................ 359/281

* cited by examiner

*Primary Examiner*—Robert H. Kim
*Assistant Examiner*—George Wang
(74) *Attorney, Agent, or Firm*—Merchant & Gould P.C.

(57) ABSTRACT

An optical device is provided, which includes optical fibers and rod lenses with their optical axes all being allowed to coincide, particularly, through optimization of the angles of faces of the rod lenses processed to have slopes, wherein the path of a center light ray entering an input fiber is allowed to coincide with the optical axes.

43 Claims, 13 Drawing Sheets

(Design Example 3-1)

(Design Example 3-2)

(Design Example 3-3)

(Design Example 3-4)

(Design Example 3-5)

(Design Example 3-6)

OPTICAL DEVICE WITH OPTICAL FIBERS AND ROD LENSES

BACKGROUND OF THE INVENTION

1. Field of the Invention

The present invention relates generally to an optical device used in a communication system in which optical fibers are utilized. More particularly, the present invention relates to an optical device having rod lenses.

2. Related Background Art

Recently, due to the explosive growth of the internet, there is a strong demand for increase in capacity of an optical fiber communications network. For the purpose of increasing the capacity, the development of WDM (Wavelength Division Multiplexing) communication has been accelerated. In the WDM communication, since lights with slightly different wavelengths convey individual pieces of information, an optical function element such as a filter, an isolator, or the like with excellent wavelength selectivity is required in an optical device.

The optical device often has a configuration such that light leaving an end face of an optical fiber from which light outgoes (hereinafter referred to as an "output fiber" throughout the present specification) is changed to a parallel beam by a collimator, and the parallel beam then is allowed to pass through a flat plate component with a filter or isolator function and is condensed by a condenser lens again to enter an end face of an optical fiber from which light enters (hereinafter referred to as an "input fiber" throughout the present specification). A rod lens with a refractive index distribution in its radial direction, a glass ball lens, a pressed aspherical lens, or the like is used as the collimator or the condenser lens. In view of the shape and aberration correction, the rod lens can be used most easily.

FIG. 1 is a schematic view showing an optical system of an optical device having rod lenses. Generally, as shown in FIG. 1, end faces (facing rod lenses) of an output fiber 1 and an input fiber 2 are processed to have slopes with a tilt angle of 6° to 8° to prevent crosstalk caused by reflected light (the tilt angle of the end face of the output fiber 1 is indicated as $\theta_{FA}$, and that of the end face of the input fiber 2 as $\theta_{FB}$). For the same reason, the end faces (facing the optical fibers) of a first rod lens 3 and a second rod lens 4 also are processed to have slopes (the tilt angle of the end face of the first rod lens 3 is indicated as $\theta_{PA}$, and that of the end face of the second rod lens 4 as $\theta_{PB}$). The output fiber 1 and the first rod lens 3 are positioned to oppose each other with a suitable air space $W_A$ being provided therebetween, and the second rod lens 4 and the input fiber 2 are positioned to oppose each other with a suitable air space $W_B$ being provided therebetween. In order to reduce the loss due to reflected light, the spaces between the output fiber 1 and the first rod lens 3 and between the second rod lens 4 and the input fiber 2 may be filled with a transparent liquid or solid with a refractive index close to that of the optical fibers and the rod lenses in some cases. An optical function element such as a filter, an isolator, or the like is placed between the rod lenses 3 and 4 (i.e. in a space L).

Generally, a single-mode fiber is used as an optical fiber for communication, and therefore a beam leaving the fiber is a Gaussian beam. In the present specification, the light ray with a highest intensity at the symmetrical center of the Gaussian beam is referred to as a "center light ray". In order to increase the coupling efficiency between the optical fibers 1 and 2 shown in FIG. 1, the respective optical fibers 1 and 2 and rod lenses 3 and 4 are required to be positioned so that the following conditions (1) to (3) are satisfied.

(1) A beam leaving the output fiber 1 is focused at a focal point on the end face of the input fiber 2.

(2) The numerical aperture NA at the focal point is the same as that of the input fiber 2.

(3) The path of the center light ray entering the input fiber 2 coincides with the optical axis of the input fiber 2.

Furthermore, it is desirable that the respective rod lenses 3 and 4 have a numerical aperture NA at least 1.5 times to 2 times the numerical aperture NA of the optical fibers so as to transmit the Gaussian beam without causing eclipse in actual use. Naturally, various aberrations in the working wavelengths should be corrected sufficiently in the rod lenses 3 and 4.

As shown in FIG. 1, however, when the optical axes of all the optical fibers and rod lenses are aligned, it becomes difficult to satisfy the conditions described above due to the presence of many processed faces with slopes. Consequently, either or both of (4) the shift of the focal point from the optical axis of the input fiber 2, or/and (5) the tilt of the center light ray with respect to the optical axis of the input fiber 2 is/are caused and thus the coupling efficiency is decreased. Table 1 below shows specific design values in the case where optical axes of all the optical fibers and rod lenses are aligned and the tilt angles ($\theta_{FA}$, $\theta_{FB}$, $\theta_{PA}$, and $\theta_{PB}$) are set to be 8° uniformly (Reference Example 1), as an example. In this case, the "shift of the focal point" is very small, but the "tilt of the center light ray" is great, namely 2.85°, resulting in low coupling efficiency, namely 77.3% (−1.118 dB). As shown in FIG. 13, therefore, it is required to make the optical axis of the input fiber 2 and center light ray coincide by making corrections in the input fiber 2 (correcting the tilt angle, positions in X and Y directions, and the like). Reference Example 2 (see Table 1 below) was obtained through a correction of the tilt angle in Reference Example 1. In Reference Example 2, the coupling efficiency is improved to 98.28% (−0.075 dB).

TABLE 1

|  | Ref. Ex. 1 | Ref. Ex. 2 |
| --- | --- | --- |
| Outgoing-Side Fiber End Face Tilt $\theta_{FA}$ | 8.00° | 8.00° |
| Outgoing-Side Space $W_A$ | 0.2351 mm | 0.2351 mm |
| Outgoing-Side Rod Lens End Face Tilt $\theta_{QA}$ | 8.00° | 8.00° |
| Outgoing-Side Rod Lens Length $Z_A$ | 4.4329 mm | 4.4329 mm |
| Lens Interval L | 2.00 mm | 2.00 mm |
| Incident-Side Rod Lens Length $Z_B$ | 4.4329 mm | 4.4329 mm |
| Incident-Side Rod Lens End Face Tilt $\theta_{QB}$ | 8.00° | 8.00° |
| Incident-Side Space $W_B$ | 0.2340 mm | 0.2340 mm |
| Incident-Side Fiber End Face Tilt $\theta_{FB}$ | 8.00° | 8.00° |
| $\theta_{QA0}$ | 4.55° | 4.55° |
| $\theta_{QB0}$ | 4.55° | 4.55° |
| $(\theta_{QA} + \theta_{QB}) - (\theta_{QA0} + \theta_{QB0})$ | −9.11° | −9.11° |
| $\theta_{3A}$ | 0.43° | 0.43° |
| $\theta_{3B}$ | 0.43° | 0.43° |
| $\theta_{3A} - \theta_{3B}$ | 0.00° | 0.00° |
| Shift between Center Light Ray and Optical Axis ΔY | 0.00005mm | 0.00005mm |

TABLE 1-continued

| | Ref. Ex. 1 | Ref. Ex. 2 |
|---|---|---|
| Tilt of Center Light Ray with respect to Optical Axis TLA | −2.850° | By the tilting of the fibers, the tilt is set to be 0°. |
| Coupling Efficiency | 0.7730 (−1.118 dB) | 0.9828 (−0.0753dB) |

Ref. Ex. = Reference Example

The same correction also can be made by the tilting or shifting of the output fiber 1 and the respective rod lenses 3 and 4, individually.

However, it takes time to correct the positions (in the X and Y directions) and the tilt angles of the optical fibers and the rod lenses, which causes cost increase.

Therefore, in view of the assembly of an optical device, for instance, as shown in FIG. 2, it is desirable to hold the output fiber 1 and the input fiber 2 with ferrules 5 with the same outer diameter as those of the first and second rod lenses 3 and 4 and to insert the input fiber 2, the second rod lens 4, the first rod lens 3, and the output fiber 1 into a single sleeve 6, sequentially. In this case, it is not possible to carry out the "position shift" and "tilt angle correction", but it is possible to adjust the positions of the respective optical fibers 1 and 2 by pulling and inserting them in a Z axis direction. In FIG. 2, numeral 8 indicates an optical function element.

In order to obtain high coupling efficiency in the configuration shown in FIG. 2, an optical system is required, which is designed so that the above-mentioned conditions are satisfied through the adjustment of the respective optical fibers 1 and 2 in the Z axis direction alone.

SUMMARY OF THE INVENTION

With such a current situation in mind, the present invention is intended to provide an optical device including optical fibers and rod lenses with all their optical axes being allowed to coincide, particularly, through optimization of the angles of faces of the rod lenses processed to have slopes, wherein the path of a center light ray entering an input fiber is allowed to coincide with the optical axes.

In order to achieve the above-mentioned object, an optical device with a first configuration according to the present invention includes an output fiber, a first rod lens, a second rod lens, an input fiber, and an optical function element. The first rod lens converts a beam leaving an end face of the output fiber into a substantially parallel light ray, and after passing through the optical function element, the substantially parallel light ray is condensed by the second rod lens and then enters the input fiber. Optical axes of the output fiber, the first rod lens, the second rod lens, and the input fiber all coincide. The refractive index distribution of the first rod lens is expressed by $$n_A(r)^2 = n_{OA}^2 \cdot \{1 - (g_A \cdot r)^2 + h_{4A}(g_A \cdot r)^4 + h_{6A}(g_A \cdot r)^6 + h_{8A}(g_A \cdot r)^8 + \ldots\}, \quad \text{Eq. 1}$$

wherein r denotes a radial distance from the optical axis of the first rod lens, $n_{OA}$ a refractive index on the optical axis of the first rod lens, and $g_A$, $h_{4A}$, $h_{6A}$, and $h_{8A}$ refractive index distribution coefficients. The refractive index distribution of the second rod lens is expressed by $$n_B(r)^2 = n_{OB}^2 \cdot \{1 - (g_B \cdot r)^2 + h_{4B}(g_B \cdot r)^4 + h_{6B}(g_B \cdot r)^6 + h_{8B}(g_B \cdot r)^8 + \ldots\}, \quad \text{Eq. 2}$$

wherein r denotes a radial distance from the optical axis of the second rod lens, $n_{OB}$ a refractive index on the optical axis of the second rod lens, and $g_B$, $h_{4B}$, $h_{6B}$, and $h_{8B}$ refractive index distribution coefficients. A relationship of $$\theta_{FA} \cdot \theta_{FB} > 0 \quad \text{Eq. 3}$$

is satisfied, wherein $\theta_{FA}$ indicates an angle between a line normal to a face, from which light outgoes, (hereinafter referred to as "an outgoing face") of the output fiber and an optical axis of the optical device as a whole and $\theta_{FB}$ denotes an angle between a line normal to a face, from which light enters, (hereinafter referred to as "an incident face") of the input fiber and the optical axis of the optical device as a whole. When $\theta_{3A}$ and $\theta_{3B}$ are defined by $$\theta_{3A} = n_{OA} \cdot g_A \cdot W_A \cdot (n_{FA}/(n_m \cdot n_{LA}) + (n_M - n_{OA}) \cdot \theta_{QA}/n_M \quad \text{Eq. 4}$$

and $$\theta_{3B} = n_{OB} \cdot g_B \cdot W_B \cdot (n_{FB} - n_{LB}) \theta_{FB}/(n_M \cdot n_{LB}) + (n_M - n_{OB}) \cdot \theta_{QB}/n_M, \quad \text{Eq. 5}$$

wherein $n_{FA}$ indicates a core-center refractive index of the output fiber, $n_{FB}$ a core-center refractive index of the input fiber, $W_A$ an interval between the output fiber and the first rod lens, $W_B$ an interval between the second rod lens and the input fiber, $n_{LA}$ a refractive index of a medium between the output fiber and the first rod lens, $n_{LB}$ a refractive index of a medium between the second rod lens and the input fiber, $n_M$ a refractive index of a medium between the first rod lens and the second rod lens, $\theta_{QA}$ an angle between a line normal to an outgoing face of the first rod lens and the optical axis of the optical device as a whole, and $\theta_{QB}$ an angle between a line normal to an incident face of the second rod lens and the optical axis of the optical device as a whole, $\theta_{3A}$ and $\theta_{3B}$ satisfy $$0 \leq |\theta_{3A} - \theta_{3B}| \leq \pi/180 \quad \text{Eq. 6}$$

and relationships of $$0 \leq |\theta_{PA}| \leq 15 \cdot (\pi/180) \quad \text{Eq. 7}$$

$$0 \leq |\theta_{PB}| 15 \cdot (\pi n/180) \quad \text{Eq. 8}$$

are satisfied, wherein $\theta_{PA}$ denotes an angle between a line normal to an incident face of the first rod lens and the optical axis of the optical device as a whole, and $\theta_{PB}$ an angle between a line normal to an outgoing face of the second rod lens and the optical axis of the optical device as a whole.

According to the optical device with the first configuration, the path of a center light ray entering the input fiber is allowed to coincide with the optical axis of the whole in the configuration in which the angles of the faces of the first and second rod lenses processed to have slopes are optimized and thus the optical axes of the output fiber, the first rod lens, the second rod lens, and the input fiber all coincide. As a result, the assembly and adjustment of the optical device can be simplified considerably, and thus the production cost can be reduced.

An optical device with a second configuration of the present invention includes an output fiber, a first rod lens, a second rod lens, an input fiber, and an optical function element. The first rod lens converts a beam leaving an end face of an output fiber into a substantially parallel light ray, and after passing through the optical function element, the substantially parallel light ray is condensed by the second rod lens and then enters the input fiber. Optical axes of the output fiber, the first rod lens, the second rod lens, and the input fiber all coincide. The refractive index distribution of the first rod lens is expressed by $$n_A(r)^2 = n_{0A}^2 \cdot \{1 - (g_A \cdot r)^2 + h_{4A}(g_A \cdot r)^4 + h_{6A}(g_A \cdot r)^6 + h_{8A}(g_A \cdot r)^8 + \ldots\},$$  Eq. 9 wherein r denotes a radial distance from the optical axis of the first rod lens, $n_{0A}$ a refractive index on the optical axis of the first rod lens, and $g_A$, $h_{4A}$, $h_{6A}$, and $h_{8A}$ refractive index distribution coefficients. The refractive index distribution of the second rod lens is expressed by $$n_B(r)^2 = n_{0B}^2 \cdot \{1 - (g_B \cdot r)^2 + h_{4B}(g_B \cdot r)^4 + h_{6B}(g_B \cdot r)^6 + h_{8B}(g_B \cdot r) + \ldots\},$$  Eq. 10 wherein r denotes a radial distance from the optical axis of the second rod lens, non a refractive index on the optical axis of the second rod lens, and $g_B$, $h_{4B}$, $h_{6B}$, and $h_{8B}$, refractive index distribution coefficients. A relationship of $$\theta_{FA} \cdot \theta_{FB} < 0$$  Eq. 11 is satisfied, wherein $\theta_{FA}$ indicates an angle between a line normal to an outgoing face of the output fiber and an optical axis of the optical device as a whole and $\theta_{FB}$ denotes an angle between a line normal to an incident face of the input fiber and the optical axis of the optical device as a whole. When $\theta_{QA0}$ and $\theta_{QB0}$ are defined by $$\theta_{QA0} = n_{0A} \cdot g_A \cdot W_A \cdot (n_{0A} - n_{LA}) \cdot \theta_{PA} / \{n_{LA} \cdot (n_{0A} - n_M)\}$$  Eq. 12 and $$\theta_{QB0} = n_{0B} \cdot g_B \cdot W_B \cdot (n_{0B} - n_{LB}) \cdot \theta_{PB} / \{n_{LB} \cdot (n_{0B} - n_M)\},$$  Eq. 13 wherein if $n_{0A} - n_M = 0$, $\theta_{QA0} = 0$, and if $n_{0B} - n_M = 0$, $\theta_{QB0} = 0$, and $n_{FA}$ indicates a core-center refractive index of the output fiber, $n_{FB}$ a core-center refractive index of the input fiber, $W_A$ an interval between the output fiber and the first rod lens, $W_B$ an interval between the second rod lens and the input fiber, $n_{LA}$ a refractive index of a medium between the output fiber and the first rod lens, $n_{LB}$ a refractive index of a medium between the second rod lens and the input fiber, $n_M$ a refractive index of a medium between the first rod lens and the second rod lens, $\theta_{PA}$ an angle between a line normal to an incident face of the first rod lens and the optical axis of the optical device as a whole, and $\theta_{PB}$ an angle between a line normal to an outgoing face of the second rod lens and the optical axis of the optical device as a whole, relationships of $$-(\pi/180) \leq \theta_{QA} - \theta_{QA0} \leq (\pi/180)$$  Eq. 14 and $$-(\pi/180) \leq \theta_{QB} - \theta_{QB0} \leq (\pi/180)$$  Eq. 15 are satisfied, wherein $\theta_{QA}$ denotes an angle between a line normal to an outgoing face of the first rod lens and the optical axis of the optical device as a whole, and $\theta_{QB}$ indicates an angle between a line normal to an incident face of the second rod lens and the optical axis of the optical device as a whole, and $\theta_{PA}$ and $\theta_{PB}$ satisfy $$0 \leq |\theta_{PA}| \leq 15 \cdot (\pi/180)$$  Eq. 16 and $$0 \leq |\theta_{PB}| \leq 15 \cdot (\pi/180).$$  Eq. 17

According to the optical device with the second configuration, the path of a center light ray entering the input fiber is allowed to coincide with the optical axis of the whole in the configuration in which the angles of the faces of the first and second rod lenses processed to have slopes are optimized and thus the optical axes of the output fiber, the first rod lens, the second rod lens, and the input fiber all coincide. As a result, the assembly and adjustment of the optical device can be simplified considerably, and thus the production cost can be reduced.

In the optical device with the first configuration of the present invention, it is preferable that when $\theta_{QA0}$ and $\theta_{QB0}$ are defined by $$\theta_{QA0} = \{(0.5 \cdot n_{0A}^2 \cdot g_A^2 \cdot L \cdot W_A - n_{LA} \cdot n_M) \cdot (n_{FA} - n_{LA}) \theta_{FA} + n_{LA} \cdot n_M (n_{0A} - n_{LA}) \cdot \theta_{PA}\} / \{0.5 \cdot n_{0A} \cdot n_{LA} \cdot g_A \cdot L \cdot (n_{0A} - n_M)\}$$  Eq. 18 in the case of L>0 and
$\theta_{QA0} = 0$ in the case of L=0, and $$\theta_{QB0} = \{(0.5 \cdot n_{0B}^2 \cdot g_B^2 \cdot L \cdot W_B - n_{LB} \cdot n_M) \cdot (n_{FB} - n_{LB}) \theta_{FB} + n_{LB} \cdot n_M (n_{0B} - n_{LB}) \cdot \theta_{PB}\} / \{0.5 \cdot n_{0B} \cdot n_{LB} \cdot g_B \cdot L \cdot (n_{0B} - n_M)\}$$  Eq. 19 in the case of L>0 and
$\theta_{QB0} = 0$ in the case of L=0,
wherein L denotes an interval between the first rod lens and the second rod lens on the optical axis of the optical device as a whole, a relationship of $$-2.5 \cdot (\pi/180) \leq (\theta_{QA} + \theta_{QB}) - (\theta_{QA0} + \theta_{QB0}) \leq +2.5 \cdot (\pi/180)$$  Eq. 20 is satisfied, wherein $\theta_{QA}$ denotes an angle between a line normal to an outgoing face of the first rod lens and the optical axis of the optical device as a whole, and $\theta_{QB}$ indicates an angle between a line normal to an incident face of the second rod lens and the optical axis of the optical device as a whole.

In the optical devices with the first and second configurations of the present invention, it is preferable that a path of a light ray at a symmetrical center of light intensity distribution of a beam leaving the output fiber coincides with the optical axis of the optical device as a whole after the light ray enters the input fiber.

In the optical devices with the first and second configurations of the present invention, it is preferable that a relationship of $1.4 \leq n_{0A} \leq 2.0$ is satisfied.

In the optical devices with the first and second configurations of the present invention, it is preferable that a relationship of $1.4 \leq n_{0B} \leq 2.0$ is satisfied.

In the optical devices with the first and second configurations of the present invention, it is preferable that a relationship of $0.125 \text{ mm} \leq 2 r_{0A} \leq 5 \text{ mm}$ is satisfied, wherein $r_{0A}$ indicates a radius of the first rod lens.

In the optical devices with the first and second configurations of the present invention, it is preferable that a relationship of $0.125 \text{ mm} \leq 2 r_{0B} \leq 5 \text{ mm}$ is satisfied, wherein $r_{0B}$ indicates a radius of the second rod lens.

In the optical devices with the first and second configurations of the present invention, it is preferable that a relationship of $0.1 \leq n_{0A} \cdot g_A \cdot r_{0A} \leq 1$ is satisfied.

In the optical devices with the first and second configurations of the present invention, it is preferable that a relationship of $0.1 \leq n_{0B} \cdot g_B \cdot r_{0B} \leq 1$ is satisfied.

In the optical devices with the first and second configurations of the present invention, it is preferable that a relationship of $4 \cdot (\pi/180) \leq |\theta_{FA}| \leq 15 \cdot (\pi/180)$ is satisfied, and further preferably, a relationship of $6 \cdot (\pi/180) \leq |\theta_{FA}| \leq 8 \cdot (\pi/180)$ is satisfied.

In the optical devices with the first and second configurations of the present invention, it is preferable that a relationship of $4 \cdot (\pi/180) \leq |\theta_{FB}| \leq 15 \cdot (\pi/180)$ is satisfied, and further preferably, a relationship of $6 \cdot (\pi/180) \leq |\theta_{FB}| \leq 8 \cdot (\pi/180)$ is satisfied.

In the optical devices with the first and second configurations of the present invention, it is preferable that a relationship of $g_A \cdot W_A \leq 0.2$ is satisfied.

In the optical devices with the first and second configurations of the present invention, it is preferable that a relationship of $g_B \cdot W_B \leq 0.2$ is satisfied.

In the optical devices with the first and second configurations of the present invention, it is preferable that a relationship of $|\theta_{FA}| = |\theta_{FB}|$ is satisfied.

In the optical devices with the first and second configurations of the present invention, it is preferable that a relationship of $n_{LA} = n_{LB}$ is satisfied, and further preferably, a relationship of $n_{LA} = n_{LB} = 1$ is satisfied.

In the optical devices with the first and second configurations of the present invention, it is preferable that relationships of $n_{OA} = n_{OB}$, $g_A = g_B$, and $r_{OA} = r_{OB}$ are satisfied.

In the optical device with the first configuration of the present invention, it is preferable that a relationship of $\theta_{PA} = \theta_{PB}$ is satisfied.

In the optical device with the second configuration of the present invention, it is preferable that a relationship of $\theta_{PA} = -\theta_{PB}$ is satisfied.

In the optical devices with the first and second configurations of the present invention, it is preferable that a relationship of $n_{FA} = n_{FB}$ is satisfied.

In the optical device with the second configuration of the present invention, it is preferable that a relationship of $\theta_{PA} = \theta_{PB} = 0$ is satisfied.

In the optical device with the second configuration of the present invention, it is preferable that relationships of $\theta_{FA} = \theta_{PA}$ and $\theta_{FB} = \theta_{PB}$ are satisfied.

DETAILED DESCRIPTION OF THE INVENTION

The present invention is described more specifically using embodiments as follows.

Figure 1:
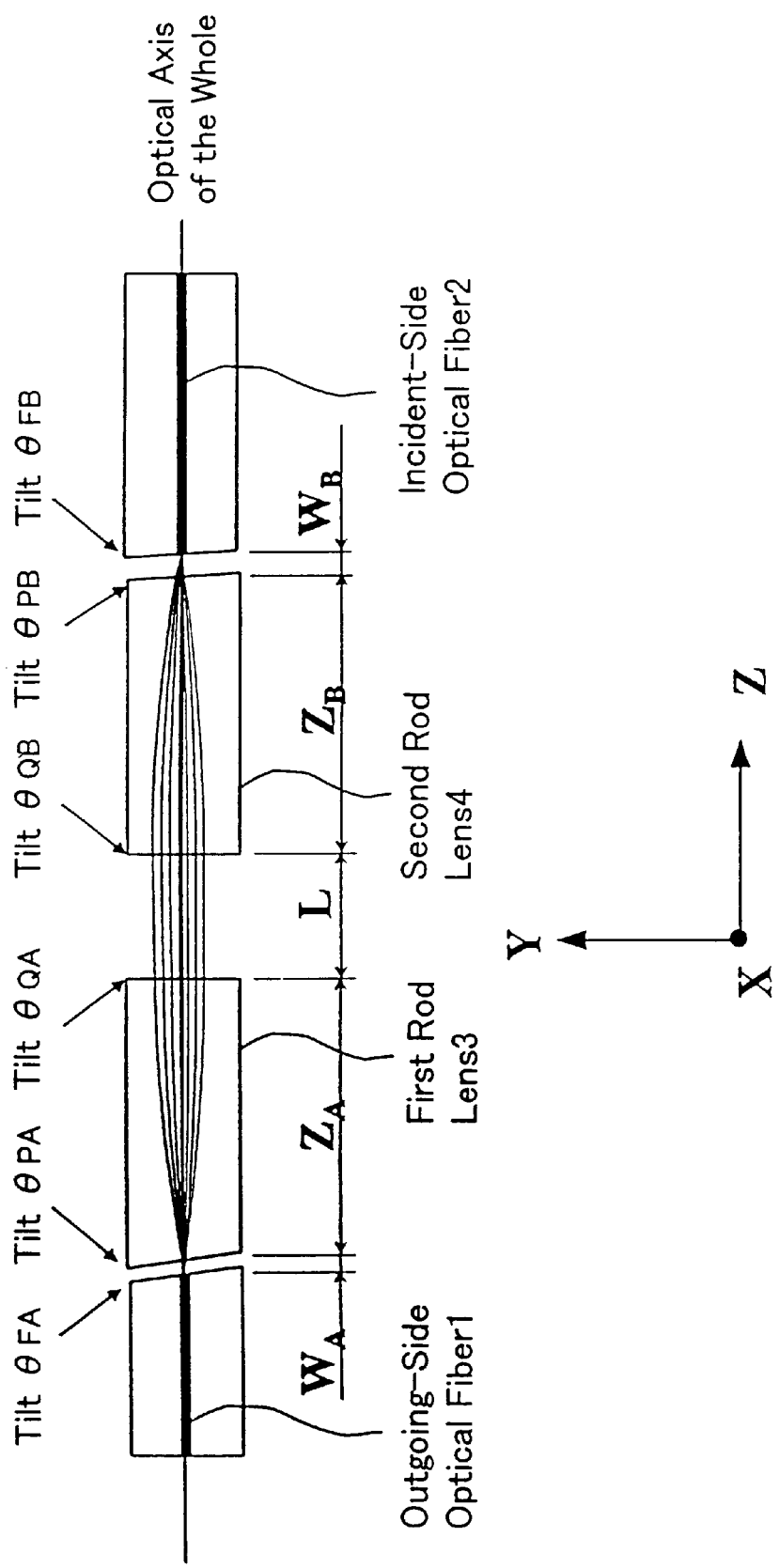
FIG. 1 is a schematic side view showing an optical system of an optical device according to the present invention.

FIG. 1 is a schematic side view showing an optical system of an optical device according to an embodiment of the present invention. As shown in FIG. 1, the optical device according to the present embodiment includes an output fiber 1, a first rod lens 3, a second rod lens 4, and an input fiber 2, which are arranged sequentially, and their optical axes all coincide.

The optical fibers (the output fiber 1 and the input fiber 2) of the present invention are described on the premise that they are single-mode fibers (whose working wavelength region is in the range of about 900 nm to 1600 nm) for optical communication. However, it should be appreciated that they can be step-index type or refractive index distribution type multimode fibers used in other wavelength regions.

The end faces (facing the rod lenses) of the output fiber 1 and the input fiber 2 are processed to have slopes so that crosstalk caused by reflected light can be prevented. In this case, it is desirable that the angle between a line normal to each end face and an optical axis of each optical fiber is in the range of 4° to 15°. In other words, when the angle between the line normal to an outgoing face of the output fiber 1 and an optical axis (a Z axis) of the optical device as a whole is indicated as $\theta_{FA}$ and the angle between the line normal to an incident face of the input fiber 2 and the optical axis (the Z axis) as $\theta_{FB}$, preferably the angles $\theta_{FA}$ and $\theta_{FB}$ satisfy $$4 \cdot (\pi/180) \leq |\theta_{FA}| \leq 15 \cdot (\pi/180) \qquad \text{Eq. 21}$$

and $$4 \cdot (\pi/180) \leq |\theta_{FB}| \leq 15 \cdot (\pi/180). \qquad \text{Eq. 22}$$

When the angles are smaller than 4°, a sufficient crosstalk prevention effect cannot be obtained. On the other hand, when the angles exceed 15°, there is a possibility that coma aberration may occur and therefore coupling efficiency may decrease.

Generally, these angles are set to be in the range of 6° to 8°, which is a more desirable range.

For the same reason, the end faces (facing the optical fibers) of the first rod lens 3 and the second rod lens 4 also are processed to have slopes. In this case, the angle between the line normal to an incident face of the first rod lens 3 and the optical axis (the Z axis) of the optical device as a whole is indicated as $\theta_{PA}$, and the angle between the line normal to an outgoing face of the second rod lens 4 and the optical axis (the Z axis) as $\theta_{PB}$.

Most of the single-mode fibers for optical communication have core-center refractive indices of about 1.44 (values in the case of quartz) and NA (a numeral aperture) values of about 0.1 (according to the definition at an intensity of $1/e^2$). However, it should be appreciated that optical fibers with other core-center refractive indices and NA values also can be used. The core-center refractive index of the output fiber 1 is indicated as $n_{FA}$, and that of the input fiber 2 as $n_{FB}$. Furthermore, the interval between the output fiber 1 and the first rod lens 3 is indicated as $W_A$, that between the second rod lens 4 and the input fiber 2 as $W_B$, that between the first rod lens 3 and the second rod lens 4 as L, the refractive index of a medium between the output fiber 1 and the first rod lens 3 as $n_{LA}$, that of a medium between the second rod lens 4 and the input fiber 2 as $n_{LB}$, and that of a medium between the first rod lens 3 and the second rod lens 4 as $n_M$.

Figure 3:
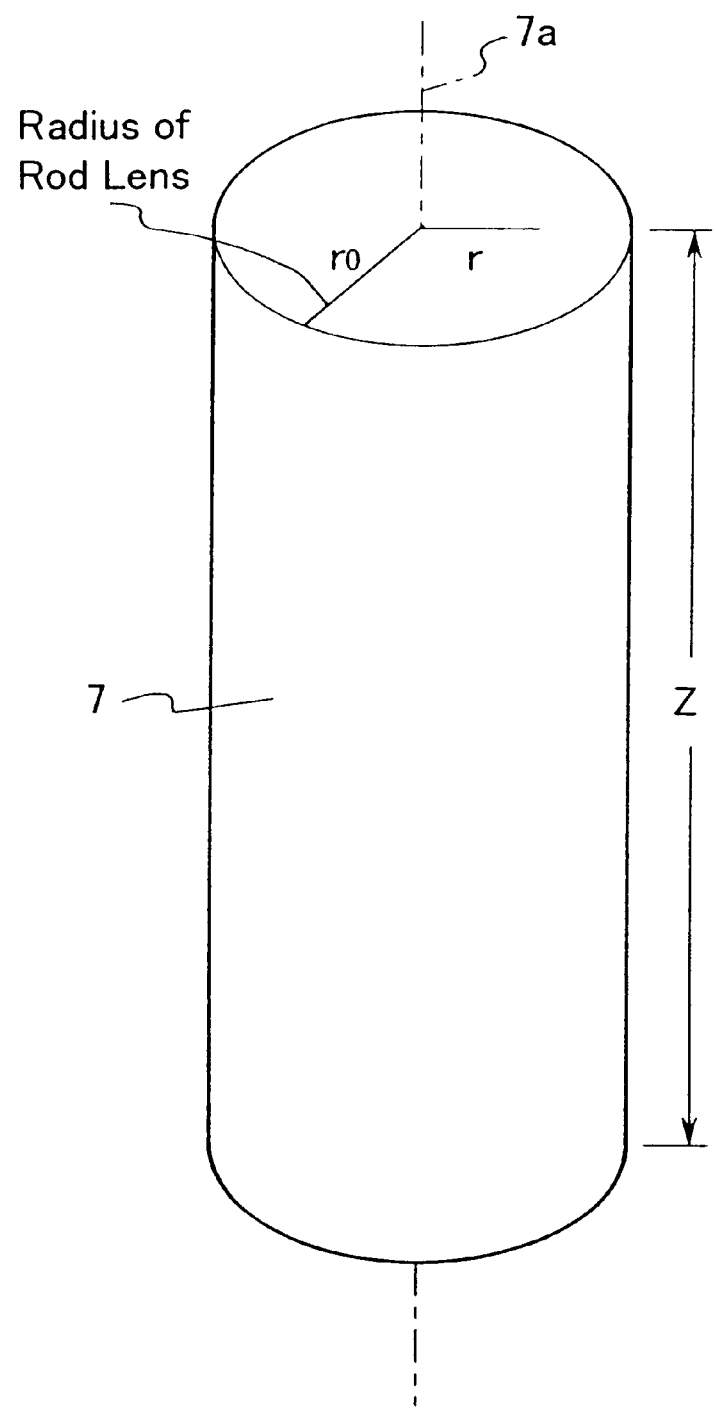
FIG. 3 is a perspective view showing a rod lens used in the optical device according to the present invention.
Figure 4:
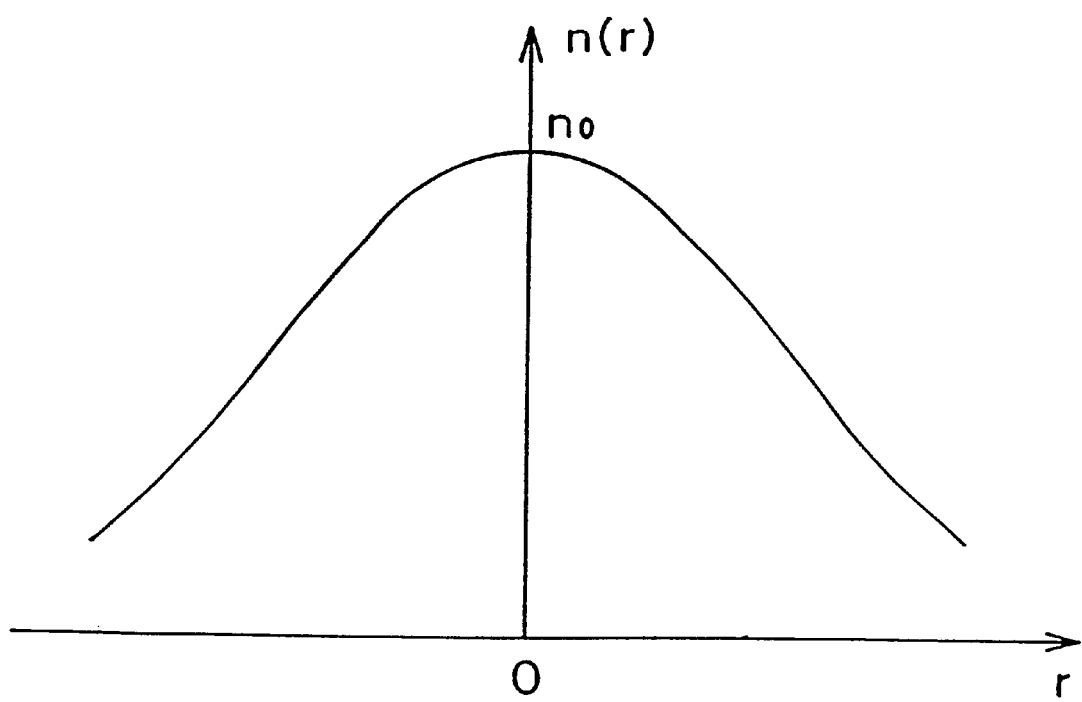
FIG. 4 is a schematic graph showing a refractive index distribution curve of the rod lens used in the optical device according to the present invention.

As shown in FIGS. 3 and 4, the refractive index n of the rod lens 7 used in the present invention distributes in its radial direction, and the refractive index distribution in the working wavelength region is expressed by $$n(r)=n_0^2 \cdot \{1-(g \cdot r)^2 + h_4 \cdot (g \cdot r)^4 + h_6 \cdot (g \cdot r)^6 + h_8 \cdot (g \cdot r)^8 + \ldots \{, \quad \text{Eq. 23}$$

wherein r denotes a radial distance from an optical axis 7a of the rod lens 7, n(r) a refractive index at the radial distance r from the optical axis 7a of the rod lens 7, $n_0$ a refractive index on the optical axis 7a of the rod lens 7 (center refractive index), and g, $h_4$, $h_6$, and $h_8$ refractive index distribution coefficients. In FIG. 3, $r_0$ indicates the radius of the rod lens 7.

Preferably, the outer diameter $2r_0$ of the rod lens 7 is in the range of 0.125 mm to 5 mm. Since the standard of the clad outer diameter in an optical fiber is 0.125 mm, it is preferable that the outer diameter of the rod lens 7 is larger than this. When the outer diameter of the rod lens 7 exceeds 5 mm, it becomes difficult to reduce the size and weight of the optical device as a whole. An outer diameter of 1.8 mm is a practical international standard and therefore, is particularly preferable.

The lower limit of the center refractive index no of the rod lens 7 is about 1.4 when glass or plastic is used as the material of the rod lens 7. When glass is used as the material of the rod lens 7 and a larger amount of component contributing to increase in refractive index, such as lead oxide, lanthanum oxide, or the like, is used so that the center refractive index $n_0$ increases to exceed 2.0, there arise problems in that the ion-exchange rate is reduced considerably and devitrification tends to occur easily.

The brightness of the rod lens 7 is defined by an angular aperture $\theta = n_0 \cdot g \cdot r_0$ (rad) indicating the range over which the lens can accept light. Preferably, this angular aperture $\theta = n_0 \cdot g \cdot r_0$ is in the range of $0.1 \leq n_0 \cdot g \cdot r_0 \leq 1.0$. A value of $n_0 \cdot g \cdot r_0$ smaller than 0.1 results in a smaller numerical aperture NA. Therefore, it becomes difficult to collect all of the light leaving from the optical fiber and thus an eclipse loss increases. On the other hand, it is difficult to manufacture a rod lens having a large difference in refractive index and a value of $n_0 \cdot g \cdot r_0$ exceeding 1.0. A further preferable range of $n_0 \cdot g \cdot r_0$ is $0.15 \leq n_0 \cdot g \cdot r_0 \leq 0.60$, wherein the rod lens 7 can be manufactured easily.

An aberration in the rod lens 7 is determined by the refractive index distribution coefficients $h_4$, $h_6$, $h_8$ . . . Under the application conditions in the present invention, if $h_4 = +0.67$, the spherical aberration is substantially within the diffraction limit when the numerical aperture NA is 0.2 or less, and therefore, a sufficient performance can be obtained. In order to reduce the aberration further, the values of $h_6$, $h_8$ . . . may be optimized.

When the one-pitch length P of the rod lens 7 is defined as $P = 2\pi/g$ and the length Z on the optical axis of the rod lens 7 is set to be equal to 0.25P, parallel light rays entering from the end face on one side are allowed to form an image on the end face on the other side. In actual use, preferably the value of Z is set to be 0.23P to 0.25P so that the interval between the rod lens 7 and an optical fiber is provided in some degree. However, it also is possible to set the value of Z to be less than 0.23P to increase the interval or to be slightly larger than 0.25P so as to compensate for beam spread due to the Gaussian beam.

The length of the first rod lens 3 in its optical axis (the Z axis) direction is indicated as $Z_A$. The refractive index $n_A$ of the first rod lens 3 has a radial distribution as described above, and the refractive index distribution in the working wavelength region is expressed by $$n_A(r)^2 = n_{0A}^2 \cdot \{1 - (g_A \cdot r)^2 + h_{4A}(g_A \cdot r)^4 + h_{6A}(g_A \cdot r)^6 + h_{8A}(g_A \cdot r)^8 + \ldots \}, \quad \text{Eq. 24}$$

wherein r denotes a radial distance from the optical axis of the first rod lens 3, $n_A(r)$ the refractive index at the radial distance r from the optical axis of the first rod lens 3, $n_{0A}$ the refractive index on the optical axis of the first rod lens 3 (center refractive index), and $g_A$, $h_{4A}$, $h_{6A}$, and $h_{8A}$ refractive index distribution coefficients.

The length of the second rod lens 4 in its optical axis (the Z axis) direction is indicated as $Z_B$. The refractive index $n_B$ of the second rod lens 4 also has a radial distribution and the refractive index distribution in the working wavelength region is expressed by $$n_B(r)^2 = n_{0B}^2 \cdot \{1 - (g_B \cdot r)^2 + h_{4B}(g_B \cdot r)^4 + h_{6B}(g_B \cdot r)^6 + h_{8B}(g_B \cdot r)^8 + \ldots \}, \quad \text{Eq. 25}$$

wherein r denotes a radial distance from the optical axis of the second rod lens 4, $n_B(r)$ the refractive index at the radial distance r from the optical axis of the second rod lens 4, $n_{0B}$ the refractive index on the optical axis of the second rod lens 4 (center refractive index), and $g_B$, $h_{4B}$, $h_{6B}$, and $h_{8B}$ refractive index distribution coefficients.

Figure 5:
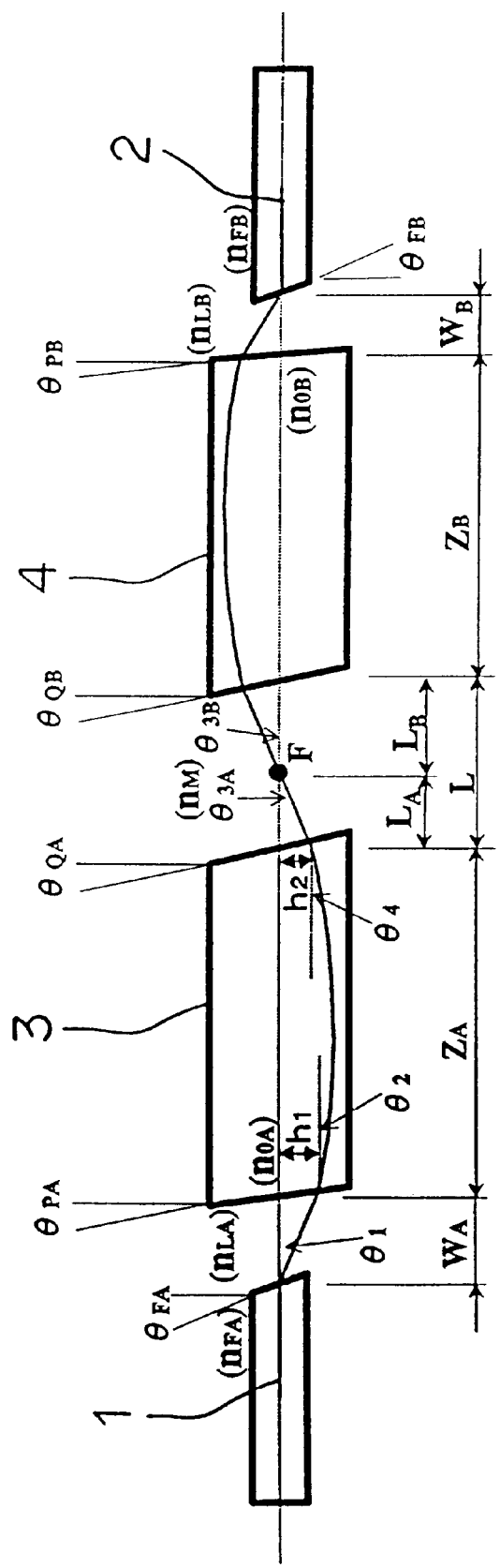
FIG. 5 is a schematic view for explaining the path of a center light ray in an embodiment according to the present invention.

FIG. 5 is a schematic view showing the path of a center light ray leaving the output fiber. In this case, $\theta_{FA} > 0$ and $\theta_{FB} > 0$, and the relationship of $$\theta_{FA} \cdot \theta_{FB} > 0 \quad \text{Eq. 26}$$

is satisfied.

After the center light ray of a beam leaving the output fiber 1 enters the input fiber 2, its path coincides with the optical axis of the whole.

With respect to the output fiber 1 and the first rod lens 3 in the left half shown in FIG. 5, when the small angle approximation ($\sin \theta = \theta$) is applied to Snell's law, equations of $$n_{FA} \cdot \theta_{FA} = n_{LA} \cdot (\theta_{FA} + \theta_1), \quad \text{Eq. 27}$$

$$h_1 = W_A \cdot \theta_1, \quad \text{Eq. 28}$$

$$n_{LA} \cdot (\theta_1 + \theta_{PA}) = n_{0A} \cdot (\theta_{PA} + \theta_2), \quad \text{Eq. 29}$$

$$h_2 = L_A \cdot \theta_{3A}, \quad \text{Eq. 30}$$

and $$n_M \cdot \theta_3 - \theta_{QA} = n_{0A} \cdot (\theta_4 - \theta_{QA}) \quad \text{Eq. 31}$$

are obtained, wherein both $h_1$ and $h_2$ are least values and therefore the refractive index of the first rod lens 3 is taken as $n_{0A}$. In this case, the intersection F of the center light ray and the optical axis of the whole is located at the midpoint between the rod lenses 3 and 4 (i.e. $L_A = L_B = 0.5L$).

The length of the rod lenses is substantially equal to a ¼ pitch length of the rod lenses and $W_A$ and $W_B$ are least values. Therefore, relationships of $$g_A \cdot h_1 = \theta_4 \quad \text{Eq. 32}$$

and $$g_A \cdot h_2 = \theta_2 \qquad \text{Eq. 33}$$

are obtained in an approximate manner.

At the point F, the relationship of $\theta_{3A}=\theta_{3B}$ is required to be satisfied. From the above relative equations, $\theta_{3A}$ and $\theta_{3B}$ are defined by $$\theta_{3A}=n_{0A}\cdot g_A \cdot W_A \cdot (n_{FA}-n_{LA})\theta_{FA}/(n_M \cdot n_{LA}) + (n_M - n_{0A})\cdot \theta_{QA}/n_M \qquad \text{Eq. 34}$$

and $$\theta_{3B}=n_{0B}\cdot g_B \cdot W_B \cdot (n_{FB}-n_{LB})\theta_{FB}/(n_M \cdot n_{LB}) + (n_M - n_{0B})\cdot \theta_{QB}/nM. \qquad \text{Eq. 35}$$

The relative equations 34 and 35 contain errors due to the small angle approximation. When consideration is given to the errors, the condition substantially to be satisfied is expressed as $$0 \leq |\theta_{3A} - \theta_{3B}| \leq \pi/180. \qquad \text{Eq. 36}$$

With respect to $\theta_{QA}$ and $\theta_{QB}$ that are not included in the above equations 34 and 35, when $\theta_1$, $\theta_2$, $\theta_{3A}$, $\theta_4$, $h_1$, and $h_2$ are eliminated from the above relative equations, a relationship of $$\theta_{QA}=\{(0.5 \cdot n_{0A}^2 \cdot g_A^2 \cdot L \cdot W_A - n_{LA} \cdot n_M)\cdot(n_{FA}-n_{LA})\theta_{FA}+n_{LA}+n_M(n_{0A}-n_{LA})\cdot \theta_{PA}\}/\{0.5 \cdot n_{0A} \cdot n_{LA} \cdot g_A \cdot L \cdot (n_{0A}-n_M)\} \qquad \text{Eq. 37}$$

is obtained.

The value defined in the right side of the above equation 37 is redefined as $\theta_{QA0}$.

Similarly, regarding the second rod lens 4 and the input fiber 2, a relationship of $$\theta_{QB}=\{(0.5 \cdot n_{0B}^2 \cdot g_B^2 \cdot L \cdot W_B - n_{LB} \cdot n_M)\cdot(n_{FB}-n^{LB})_{FB}+n_{LB} \cdot n_M(n_{0B}-n_{LB})\cdot \theta_{PB}\}/\{0.5 \cdot n_{0B} \cdot n_{LB} \cdot g_B \cdot L \cdot (n_{0B}-n_M)\} \qquad \text{Eq. 38}$$

is obtained.

The value defined in the right side of the above equation 38 is redefined as $\theta_{QB0}$.

In the equations 37 and 38, when L=0, $\theta_{QA0}=\theta_{QB0}=0$.

The relative equations 37 and 38 contain errors due to the small angle approximation. When consideration is given to the errors, actual $\theta_{QA}$ and $\theta_{QB}$ are different from $\theta_{QA0}$ and $\theta_{QB0}$, and the conditions substantially to be satisfied are expressed by $$-2.5 \cdot (\pi/180) \leq \theta_{QA} - \theta_{QA0} \leq +2.5 \cdot (\pi/180)$$

and $$-2.5 \cdot (\pi/180) \leq \theta_{QB} - \theta_{QB0} \leq +2.5 \cdot (\pi/180). \qquad \text{Eq. 39}$$

When $L_A=L_B=0.5L$, the conditions of the equation 39 substantially are satisfied and an excellent symmetry of the whole optical system is obtained, which enables the respective rod lenses to have the same shape and therefore, is preferable. However, when the point F is shifted considerably from the midpoint of both rod lenses, the equation 39 is not satisfied and the condition to be satisfied is expressed as $$-2.5 \cdot (\pi/180) \leq (\theta_{QA}+\theta_{QB})-(\theta_{QA0}+\theta_{QB0}) \leq +2.5 \cdot (\pi/180). \qquad \text{Eq. 40}$$

Figure 2:
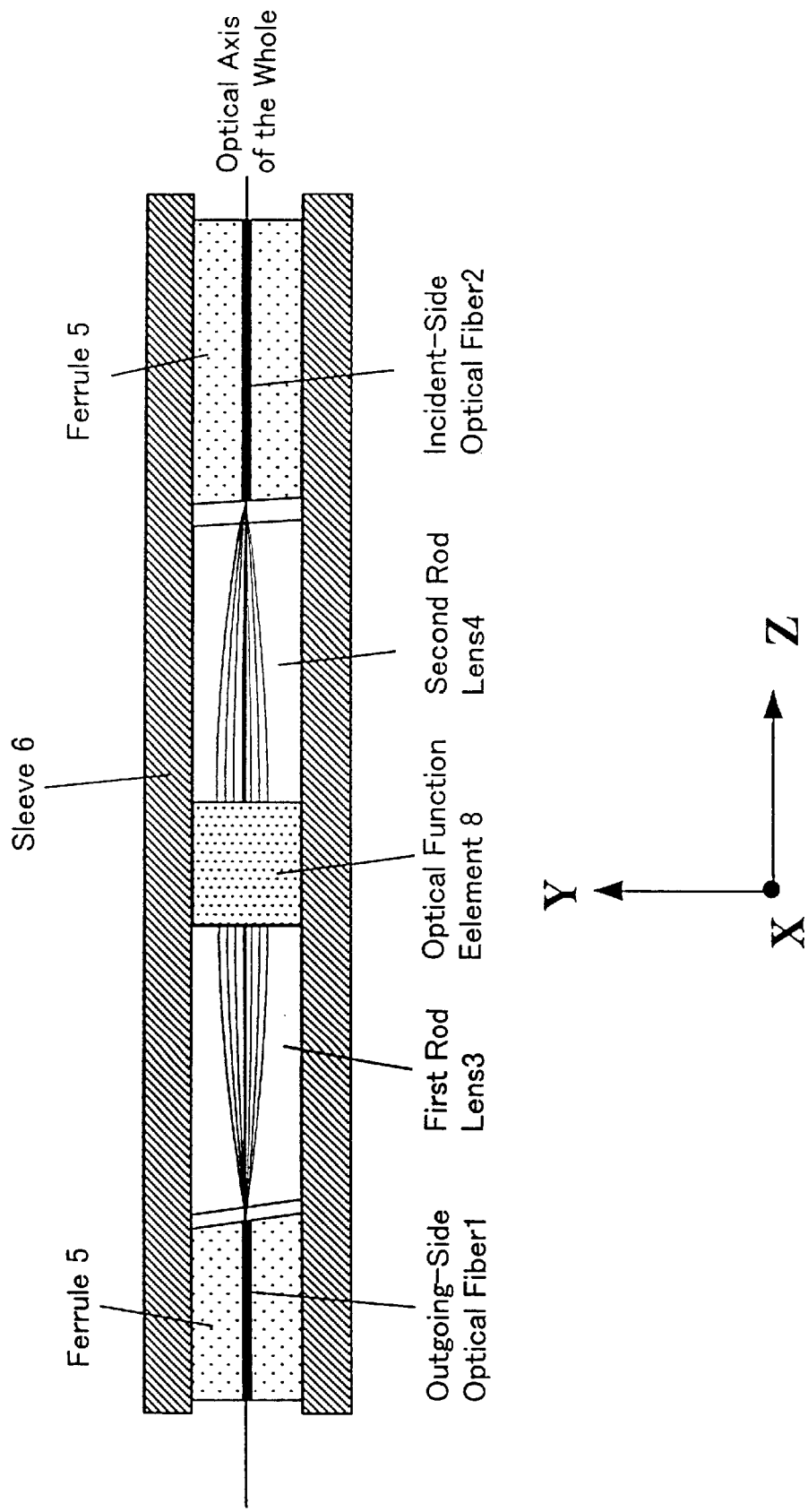
FIG. 2 is a schematic sectional view showing an embodiment of the optical device according to the present invention.

When either the equation 36 or the equations 36 and 40 is satisfied, the angles of the faces of the first and second rod lenses 3 and 4 processed to have slopes are optimized and in the configuration including the output fiber 1, the first rod lens 3, the second rod lens 4, and the input fiber 2 with their optical axes all being allowed to coincide, the path of a center light ray entering the input fiber 2 is allowed to coincide with the optical axis of the whole. As a result, the assembly and adjustment of the optical device can be simplified considerably, and thus the production cost can be reduced. In other words, as shown in FIG. 2, the optical device can be assembled by a simple process including maintaining the output fiber 1 and the input fiber 2 with the ferrules 5 with the same outer diameter as those of the first and second rod lenses 3 and 4 and sequentially inserting the input fiber 2, the second rod lens 4, the first rod lens 3, and the output fiber 1 into the single sleeve 6.

Figure 6:
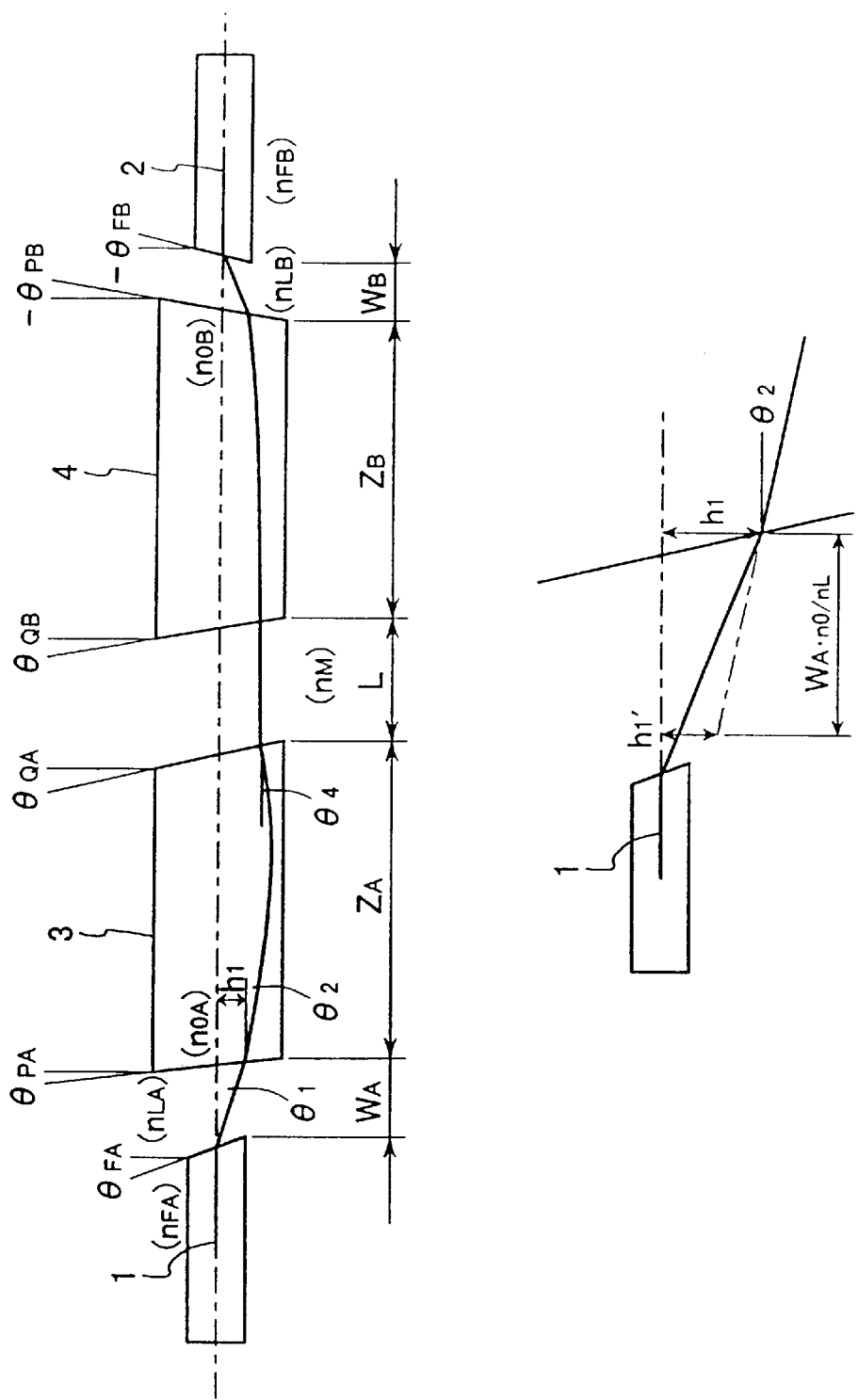
FIG. 6 is a schematic view for explaining the path of a center light ray in another embodiment according to the present invention.
Figure 7:
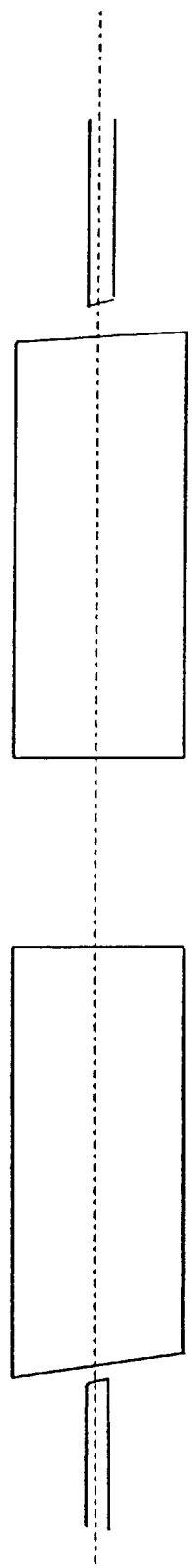
FIG. 7 is a schematic side view showing an optical system according to Design Example 3-1 of the present invention.
Figure 8:
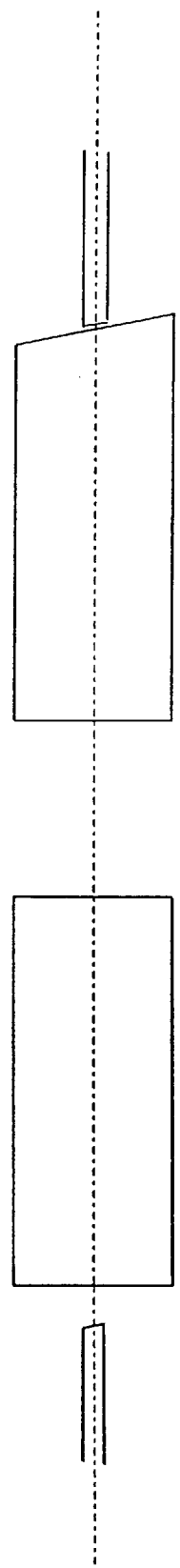
FIG. 8 is a schematic side view showing an optical system according to Design Example 3-2 of the present invention.
Figure 9:
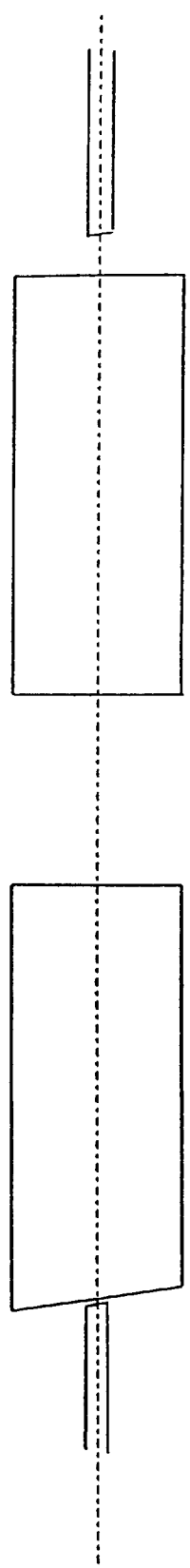
FIG. 9 is a schematic side view showing an optical system according to Design Example 3-3 of the present invention.
Figure 10:
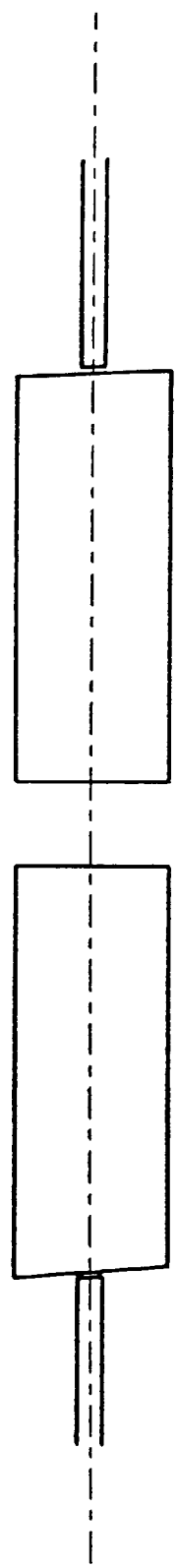
FIG. 10 is a schematic side view showing an optical system according to Design Example 3-4 of the present invention.
Figure 11:
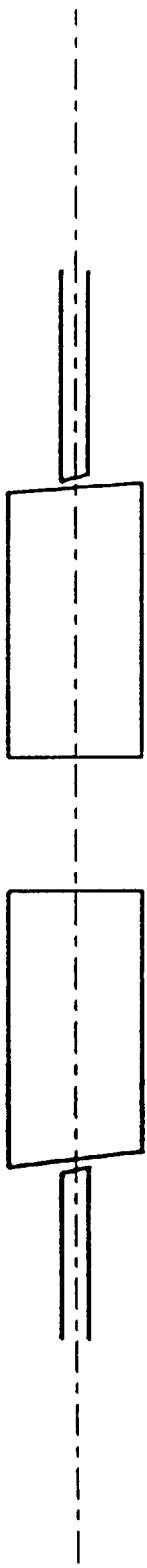
FIG. 11 is a schematic side view showing an optical system according to Design Example 3-5 of the present invention.
Figure 12:
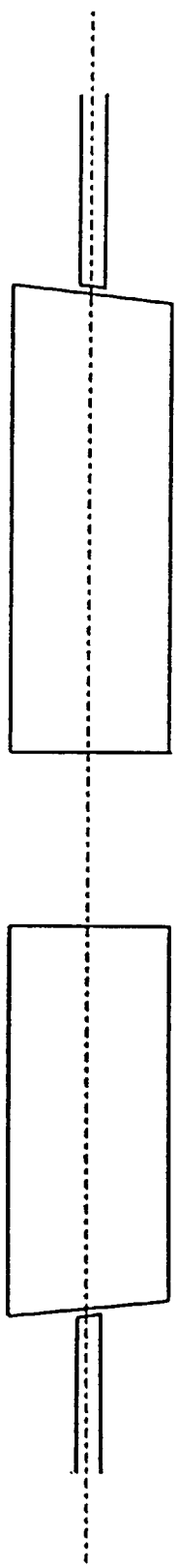
FIG. 12 is a schematic side view showing an optical system according to Design Example 3-6 of the present invention.
Figure 13:
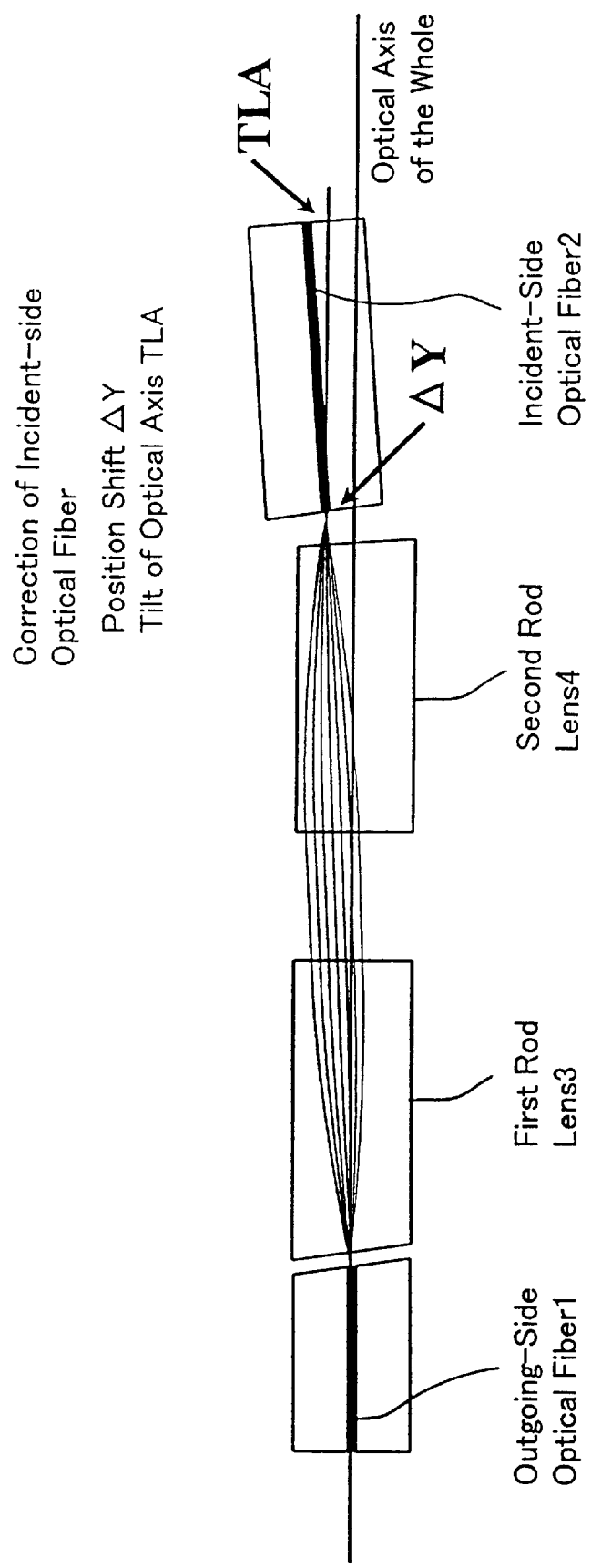
FIG. 13 is a schematic side view showing an optical system of a conventional optical device.

FIG. 6 is a schematic view showing a path of a center light ray leaving an output fiber in another example of optical devices according to the present invention.

In the optical device of the present invention, as shown in FIG. 6, an output fiber 1, a first rod lens 3, a second rod lens 4, and an input fiber 2 may be arranged so that a face of the output fiber 1 facing the first rod lens 3 and a face of the input fiber 2 facing the second rod lens 4 have substantial plane symmetry, i.e. so that a relationship of $$\theta_{FA} \cdot \theta_{FB} < 0 \qquad \text{Eq. 41}$$

is satisfied.

After the center light ray of a beam leaving the output fiber 1 enters the input fiber 2, its path coincides with the optical axis of the whole.

In this case, the center light ray may be allowed to be parallel to the optical axis of the whole regardless of the interval L.

With respect to the output fiber 1 and the first rod lens 3 in the left half shown in FIG. 6, when the small angle approximation (sin $\theta=\theta$) is applied to Snell's law, equations of $$n_{FA} \cdot \theta_{FA} = n_{LA} \cdot (\theta_{FA+\theta 1}), \qquad \text{Eq. 42}$$

$$h_1 = W_A \cdot \theta_1, \qquad \text{Eq. 43}$$

$$n_L \cdot (\theta_1 + \theta_{PA}) = n_{0A} \cdot (\theta_{PA} + \theta_2), \qquad \text{Eq. 44}$$

and $$-n_M \cdot \theta_{QA} = n_{0A} \cdot (\theta_4 - \theta_{QA}) \qquad \text{Eq. 45}$$

are obtained.

When the length of the rod lenses is a ¼ pitch length of the rod lenses, the approximation of $$\theta_4 = g_A \cdot h_1 \qquad \text{Eq. 46}$$

is obtained. However, when the interval $W_A$ is corrected, relationships of $$\theta_4 = g_A \cdot h_{1'} \qquad \text{Eq. 47}$$

and $$h_{1'} = h_1 - n_0 \cdot W_A \theta_2 / n_L \qquad \text{Eq. 48}$$

are obtained.

When $\theta_1$, $\theta_2$, $\theta_4$, $h_1$, and $h_{1'}$ are eliminated from the above relative equations (except for the equation 46), a relationship of $$\theta_{QA}=n_{0A} \cdot g_A \cdot W_A \cdot (n_{0A}-n_{LA}) \cdot \theta_{PA} / \{n_{LA} \cdot (n_{0A} n_M)\} \qquad \text{Eq. 49}$$

is obtained.

The value defined in the right side of the above equation 49 is redefined as $\theta_{QA0}$ (when $n_{0A}-n_M=0$, $\theta_{QA0}=0$).

Similarly, regarding the second rod lens 4 and the input fiber 2, a relationship of $$\theta_{QB}=n_{OB}\cdot g_B\cdot W_B\cdot(n_{OB}-n_{LB})\cdot\theta_{PB}/\{n_{LB}\cdot(n_{OB}-n_M)\} \quad \text{Eq. 50}$$

is obtained.

The value defined in the right side of the above equation 50 is redefined as $\theta_{QB0}$ (when $n_{OB}-n_M=0$, $\theta_{QB0}=0$) The relative equations 49 and 50 contain errors due to the small angle approximation. When consideration is given to the errors, the conditions substantially to be satisfied are expressed by $$-(\pi/180)\leq\theta_{QA}-\theta_{QA0}\leq(\pi/180) \quad \text{Eq. 51}$$

$$-(\pi/180)\leq\theta_{QB}-\theta_{QB0}\leq(\pi/180). \quad \text{Eq. 52}$$

When the equations 51 and 52 are satisfied, the angles of the faces of the first and second rod lenses 3 and 4 processed to have slopes are optimized, and in the configuration including the output fiber 1, the first rod lens 3, the second rod lens 4, and the input fiber 2 with their optical axes all being allowed to coincide, the path of a center light ray entering the input fiber 2 is allowed to coincide with the optical axis of the whole. As a result, the assembly and adjustment of the optical device can be simplified considerably, and thus the production cost can be reduced.

In an actual optical device, in both cases of positive and negative values of $\theta_{FA}\cdot\theta_{FB}$, it is desirable to add the following conditions (6) to (12) to reduce the kinds of components to improve productivity.

(6) Absolute values of the angles of the end face of the output fiber 1 facing the first rod lens 3 and of the end face of the input fiber 2 facing the second rod lens 4 are made the same (i.e. $|\theta_{FA}|=|\theta_{FB}|$).

(7) The spaces between the output fiber 1 and the first rod lens 3 and between the second rod lens 4 and the input fiber 2 are filled with the same medium, for example, air (i.e. $n_{LA}=n_{LB}$).

(8) The same materials are used for the first and second rod lenses 3 and 4 (i.e. $n_{OA}=n_{OB}$, $g_A=g_B$ and $r_{OA}=r_{OB}$).

(9) Absolute values of the angles of the end face of the first rod lens 3 facing the output fiber 1 and of the end face of the second rod lens 4 facing the input fiber 2 are made the same (i.e. $|\theta_{PA}|=|\theta_{PB}|$).

(10) The same core material is used for the output fiber 1 and the input fiber 2 (i.e. $n_{FA}=n_{FB}$).

(11) The angle of the outgoing face of the first rod lens 3 and that of the incident face of the second rod lens 4 are set to be 0 (i.e. $\theta_{QA}=\theta_{QB}=0$)

(12) The face of the first rod lens 3 facing the output fiber 1 is allowed to be parallel to the end face of the output fiber 1. Similarly, the face of the second rod lens 4 facing the input fiber 2 is allowed to be parallel to the end face of the input fiber 2 (i.e. $\theta_{PA}=\theta_{FA}$ and $\theta_{PB}=\theta_{FB}$).

Since longer intervals $W_A$ and $W_B$ tend to cause coma aberrations, it is desirable that relationships of $$g_A\cdot W_A\leq 0.2 \quad \text{Eq. 53}$$

and $$g_B\cdot W_B\leq 0.2 \quad \text{Eq. 54}$$

are satisfied.

EXAMPLES

The present invention is described further in detail with specific examples.

The designs and coupling efficiency of optical systems were calculated using an optical design software program "OSLO SIX" manufactured by Sinclair Optics, U.S.A.

Design Examples 1-1 to 1-128 shown in Tables 2-1 to 5-3 below are designed using a diameter $2r_0$ of rod lenses normalized as 1 in optical devices with the configuration shown in FIG. 5. Every design example satisfies the above-mentioned respective conditions. In every design example, after a center light ray enters an input fiber, its path coincides with the optical axis of the whole.

Design Examples 2-1 to 2-6 shown in Tables 6-1 to 6-3 below are designed using a diameter $2r_0$ of the rod lenses normalized as 1 in optical devices with the configuration shown in FIG. 6. In the design examples in Tables 2-1 to 6-3, a fourth-order refractive index distribution coefficient $h_4$ is set to be +0.67, and sixth-order or higher-order refractive index distribution coefficients all are set to be 0.

When specific values from the range of 0.125 mm $\leq 2r_0 \leq$ 5 mm are selected as $r_0$ in Tables 2-1 to 6-3, values of W, Z, and L with a unit of length may be set to be proportional to $r_0$ and a value of g with a unit of (length)$^{-1}$ may be set to be inversely proportional to $r_0$. The refractive index n and the refractive index distribution coefficients $h_4$, $h_6$, $h_8$ . . . are dimensionless. In addition, the unit of angle in Tables 2-1 to 6-3 is "° (degrees)".

TABLE 2-1

| Des. Ex. No. | $n_{FA}$ | $n_{FB}$ | $\theta_{FA}$ ° | $\theta_{FB}$ ° | $n_{LA}$ | $n_{LB}$ | $W_A$ | $W_B$ | $n_{OA}$ | $n_{OB}$ |
|---|---|---|---|---|---|---|---|---|---|---|
| 1-1 | 1.444 | 1.444 | 8.0 | 8.0 | 1.000 | 1.000 | 0.030 | 0.030 | 1.400 | 1.400 |
| 1-2 | 1.444 | 1.444 | 8.0 | 8.0 | 1.000 | 1.000 | 0.030 | 0.030 | 1.444 | 1.444 |
| 1-3 | 1.444 | 1.444 | 8.0 | 8.0 | 1.000 | 1.000 | 0.030 | 0.030 | 1.500 | 1.500 |
| 1-4 | 1.444 | 1.444 | 8.0 | 8.0 | 1.000 | 1.000 | 0.030 | 0.030 | 1.600 | 1.600 |
| 1-5 | 1.444 | 1.444 | 8.0 | 8.0 | 1.000 | 1.000 | 0.030 | 0.030 | 1.700 | 1.700 |
| 1-6 | 1.444 | 1.444 | 8.0 | 8.0 | 1.000 | 1.000 | 0.030 | 0.030 | 1.800 | 1.800 |
| 1-7 | 1.444 | 1.444 | 8.0 | 8.0 | 1.000 | 1.000 | 0.030 | 0.030 | 2.000 | 2.000 |
| 1-8 | 1.444 | 1.444 | 8.0 | 8.0 | 1.000 | 1.000 | 0.003 | 0.003 | 1.444 | 1.444 |
| 1-9 | 1.444 | 1.444 | 8.0 | 8.0 | 1.000 | 1.000 | 0.300 | 0.300 | 1.444 | 1.444 |
| 1-10 | 1.444 | 1.444 | 8.0 | 8.0 | 1.000 | 1.000 | 0.030 | 0.030 | 1.444 | 1.444 |
| 1-11 | 1.444 | 1.444 | 8.0 | 8.0 | 1.000 | 1.000 | 0.030 | 0.030 | 1.444 | 1.444 |
| 1-12 | 1.444 | 1.444 | 8.0 | 8.0 | 1.000 | 1.000 | 0.030 | 0.030 | 1.444 | 1.444 |
| 1-13 | 1.444 | 1.444 | 8.0 | 8.0 | 1.000 | 1.000 | 0.030 | 0.030 | 1.444 | 1.444 |
| 1-14 | 1.444 | 1.444 | 8.0 | 8.0 | 1.000 | 1.000 | 0.030 | 0.030 | 1.444 | 1.444 |
| 1-15 | 1.444 | 1.444 | 8.0 | 8.0 | 1.000 | 1.000 | 0.003 | 0.003 | 1.600 | 1.600 |
| 1-16 | 1.444 | 1.444 | 8.0 | 8.0 | 1.000 | 1.000 | 0.010 | 0.010 | 1.600 | 1.600 |

TABLE 2-1-continued

| Des. Ex. No. | $n_{FA}$ | $n_{FB}$ | $\theta_{FA}$ ° | $\theta_{FB}$ ° | $n_{LA}$ | $n_{LB}$ | $W_A$ | $W_B$ | $n_{0A}$ | $n_{0B}$ |
|---|---|---|---|---|---|---|---|---|---|---|
| 1-17 | 1.444 | 1.444 | 8.0 | 8.0 | 1.000 | 1.000 | 0.100 | 0.100 | 1.600 | 1.600 |
| 1-18 | 1.444 | 1.444 | 8.0 | 8.0 | 1.000 | 1.000 | 0.300 | 0.300 | 1.600 | 1.600 |
| 1-19 | 1.444 | 1.444 | 8.0 | 8.0 | 1.000 | 1.000 | 0.030 | 0.030 | 1.600 | 1.600 |
| 1-20 | 1.444 | 1.444 | 8.0 | 8.0 | 1.000 | 1.000 | 0.030 | 0.030 | 1.600 | 1.600 |
| 1-21 | 1.444 | 1.444 | 8.0 | 8.0 | 1.000 | 1.000 | 0.030 | 0.030 | 1.600 | 1.600 |
| 1-22 | 1.444 | 1.444 | 8.0 | 8.0 | 1.000 | 1.000 | 0.030 | 0.030 | 1.600 | 1.600 |
| 1-23 | 1.444 | 1.444 | 8.0 | 8.0 | 1.000 | 1.000 | 0.030 | 0.030 | 1.600 | 1.600 |
| 1-24 | 1.444 | 1.444 | 8.0 | 8.0 | 1.000 | 1.000 | 0.030 | 0.030 | 1.600 | 1.600 |
| 1-25 | 1.444 | 1.444 | 8.0 | 8.0 | 1.000 | 1.000 | 0.001 | 0.001 | 2.000 | 2.000 |
| 1-26 | 1.444 | 1.444 | 8.0 | 8.0 | 1.000 | 1.000 | 0.300 | 0.300 | 2.000 | 2.000 |
| 1-27 | 1.444 | 1.444 | 8.0 | 8.0 | 1.000 | 1.000 | 0.030 | 0.030 | 2.000 | 2.000 |
| 1-28 | 1.444 | 1.444 | 8.0 | 8.0 | 1.000 | 1.000 | 0.030 | 0.030 | 2.000 | 2.000 |
| 1-29 | 1.444 | 1.444 | 8.0 | 8.0 | 1.000 | 1.000 | 0.030 | 0.030 | 2.000 | 2.000 |
| 1-30 | 1.444 | 1.444 | 8.0 | 8.0 | 1.000 | 1.000 | 0.030 | 0.030 | 2.000 | 2.000 |
| 1-31 | 1.444 | 1.444 | 8.0 | 8.0 | 1.000 | 1.000 | 0.030 | 0.030 | 2.000 | 2.000 |
| 1-32 | 1.444 | 1.444 | 6.0 | 6.0 | 1.000 | 1.000 | 0.030 | 0.030 | 1.400 | 1.400 |

Des. Ex. No. = Design Example Number

TABLE 2-2

| Des. Ex. No. | $g_A$ | $g_B$ | $Z_A$ | $Z_B$ | $L$ | $n_M$ | $\theta_{PA}$ ° | $\theta_{QA}$ ° | $\theta_{QB}$ ° | $\theta_{PB}$ ° |
|---|---|---|---|---|---|---|---|---|---|---|
| 1-1 | 0.600 | 0.600 | 2.575 | 2.575 | 1.0 | 1.0 | 8.78 | 0.00 | 0.00 | 8.78 |
| 1-2 | 0.600 | 0.600 | 2.573 | 2.573 | 1.0 | 1.0 | 7.92 | 0.00 | 0.00 | 7.92 |
| 1-3 | 0.600 | 0.600 | 2.572 | 2.572 | 1.0 | 1.0 | 7.04 | 0.00 | 0.00 | 7.04 |
| 1-4 | 0.600 | 0.600 | 2.569 | 2.569 | 1.0 | 1.0 | 5.87 | 0.00 | 0.00 | 5.87 |
| 1-5 | 0.600 | 0.600 | 2.566 | 2.566 | 1.0 | 1.0 | 5.03 | 0.00 | 0.00 | 5.03 |
| 1-6 | 0.600 | 0.600 | 2.563 | 2.563 | 1.0 | 1.0 | 4.40 | 0.00 | 0.00 | 4.40 |
| 1-7 | 0.600 | 0.600 | 2.556 | 2.556 | 1.0 | 1.0 | 3.51 | 0.00 | 0.00 | 3.51 |
| 1-8 | 0.600 | 0.600 | 2.614 | 2.614 | 1.0 | 1.0 | 7.98 | 0.00 | 0.00 | 8.06 |
| 1-9 | 0.600 | 0.600 | 2.183 | 2.183 | 1.0 | 1.0 | 7.64 | 0.00 | 0.00 | 7.46 |
| 1-10 | 0.600 | 0.600 | 2.574 | 2.574 | 0.0 | 1.0 | 8.01 | 0.00 | 0.00 | 8.01 |
| 1-11 | 0.600 | 0.600 | 2.574 | 2.574 | 10.0 | 1.0 | 7.20 | 0.00 | 0.00 | 7.20 |
| 1-12 | 0.600 | 0.600 | 2.574 | 2.574 | 30.0 | 1.0 | 6.00 | 0.00 | 0.00 | 5.99 |
| 1-13 | 0.200 | 0.200 | 7.81 | 7.81 | 1.0 | 1.0 | 7.99 | 0.00 | 0.00 | 7.99 |
| 1-14 | 1.000 | 1.000 | 1.526 | 1.526 | 1.0 | 1.0 | 7.77 | 0.00 | 0.00 | 7.77 |
| 1-15 | 0.600 | 0.600 | 2.614 | 2.614 | 1.0 | 1.0 | 5.94 | 0.00 | 0.00 | 5.95 |
| 1-16 | 0.600 | 0.600 | 2.601 | 2.601 | 1.0 | 1.0 | 5.92 | 0.00 | 0.00 | 5.92 |
| 1-17 | 0.600 | 0.600 | 2.455 | 2.455 | 1.0 | 1.0 | 5.74 | 0.00 | 0.00 | 5.74 |
| 1-18 | 0.600 | 0.600 | 2.141 | 2.141 | 1.0 | 1.0 | 5.67 | 0.00 | 0.00 | 5.67 |
| 1-19 | 0.600 | 0.600 | 2.569 | 2.569 | 0.0 | 1.0 | 5.95 | 0.00 | 0.00 | 5.95 |
| 1-20 | 0.600 | 0.600 | 2.569 | 2.569 | 3.0 | 1.0 | 5.71 | 0.00 | 0.00 | 5.71 |
| 1-21 | 0.600 | 0.600 | 2.569 | 2.569 | 10.0 | 1.0 | 5.23 | 0.00 | 0.00 | 5.28 |
| 1-22 | 0.600 | 0.600 | 2.569 | 2.569 | 30.0 | 1.0 | 4.21 | 0.00 | 0.00 | 4.21 |
| 1-23 | 0.200 | 0.200 | 7.805 | 7.805 | 1.0 | 1.0 | 5.94 | 0.00 | 0.00 | 5.94 |
| 1-24 | 1.000 | 1.000 | 1.522 | 1.522 | 1.0 | 1.0 | 5.74 | 0.00 | 0.00 | 5.74 |
| 1-25 | 0.600 | 0.600 | 2.615 | 2.615 | 1.0 | 1.0 | 3.57 | 0.00 | 0.00 | 3.57 |
| 1-26 | 0.600 | 0.600 | 2.031 | 2.031 | 1.0 | 1.0 | 3.33 | 0.00 | 0.00 | 3.34 |
| 1-27 | 0.600 | 0.600 | 2.556 | 2.556 | 0.0 | 1.0 | 3.58 | 0.00 | 0.00 | 3.58 |
| 1-28 | 0.600 | 0.600 | 2.557 | 2.557 | 10.0 | 1.0 | 2.95 | 0.00 | 0.00 | 2.95 |
| 1-29 | 0.600 | 0.600 | 2.557 | 2.557 | 30.0 | 1.0 | 2.18 | 0.00 | 0.00 | 2.19 |
| 1-30 | 0.200 | 0.200 | 7.793 | 7.793 | 1.0 | 1.0 | 3.57 | 0.00 | 0.00 | 3.57 |
| 1-31 | 1.000 | 1.000 | 1.509 | 1.509 | 1.0 | 1.0 | 3.39 | 0.00 | 0.00 | 3.39 |
| 1-32 | 0.600 | 0.600 | 2.575 | 2.575 | 1.0 | 1.0 | 6.59 | 0.00 | 0.00 | 6.59 |

Des. Ex. No. = Design Example Number

TABLE 2-3

| Des. Ex. No. | $\theta_{QA0}$ ° | $\theta_{QB0}$ ° | $\theta_{QA} - \theta_{QA0}$ ° | $\theta_{QB} - \theta_{QB0}$ ° | $(\theta_{QA} + \theta_{QB}) - (\theta_{QA0} + \theta_{QB0})$ ° | $\theta_{3A}$ ° | $\theta_{3B}$ ° | $\theta_{3A} - \theta_{3B}$ ° |
|---|---|---|---|---|---|---|---|---|
| 1-1 | −0.02 | −0.03 | 0.024 | 0.026 | 0.05 | 0.090 | 0.090 | 0.000 |
| 1-2 | 0.02 | 0.01 | −0.016 | −0.014 | −0.03 | 0.092 | 0.092 | 0.000 |
| 1-3 | 0.04 | 0.04 | −0.043 | −0.043 | −0.09 | 0.096 | 0.096 | 0.000 |
| 1-4 | 0.06 | 0.06 | −0.062 | −0.062 | −0.12 | 0.102 | 0.102 | 0.000 |

TABLE 2-3-continued

| Des. Ex. No. | $\theta_{QA0}$ ° | $\theta_{QB0}$ ° | $\theta_{QA}-\theta_{QA0}$ ° | $\theta_{QB}-\theta_{QB0}$ ° | $(\theta_{QA}+\theta_{QB})-(\theta_{QA0}+\theta_{QB0})$ ° | $\theta_{3A}$ ° | $\theta_{3B}$ ° | $\theta_{3A}-\theta_{3B}$ ° |
|---|---|---|---|---|---|---|---|---|
| 1-5 | 0.06 | 0.07 | −0.063 | −0.066 | −0.13 | 0.109 | 0.109 | 0.000 |
| 1-6 | 0.06 | 0.06 | −0.062 | −0.062 | −0.12 | 0.115 | 0.115 | 0.000 |
| 1-7 | 0.05 | 0.05 | −0.055 | −0.055 | −0.11 | 0.128 | 0.128 | 0.000 |
| 1-8 | −0.03 | 0.16 | 0.027 | −0.160 | −0.13 | 0.009 | 0.009 | 0.000 |
| 1-9 | 1.25 | 0.82 | −1.251 | −0.824 | −2.07 | 0.923 | 0.923 | 0.000 |
| 1-10 | 0.00 | 0.00 | 0.000 | 0.000 | 0.00 | 0.092 | 0.092 | 0.000 |
| 1-11 | 0.02 | 0.02 | −0.023 | −0.022 | −0.05 | 0.092 | 0.092 | 0.000 |
| 1-12 | 0.05 | 0.05 | −0.054 | −0.053 | −0.11 | 0.092 | 0.092 | 0.000 |
| 1-13 | 0.01 | 0.00 | −0.007 | 0.000 | −0.01 | 0.031 | 0.031 | 0.000 |
| 1-14 | 0.03 | 0.03 | −0.034 | −0.031 | −0.06 | 0.154 | 0.154 | 0.000 |
| 1-15 | 0.05 | 0.07 | −0.052 | −0.073 | −0.12 | 0.009 | 0.009 | 0.000 |
| 1-16 | 0.05 | 0.05 | −0.053 | −0.048 | −0.10 | 0.034 | 0.034 | 0.000 |
| 1-17 | 0.18 | 0.18 | −0.185 | −0.185 | 0.37 | 0.341 | 0.341 | 0.000 |
| 1-18 | 1.18 | 1.18 | −1.180 | −1.178 | −2.36 | 1.023 | 1.023 | 0.000 |
| 1-19 | 0.00 | 0.00 | 0.000 | 0.000 | 0.00 | 0.102 | 0.102 | 0.000 |
| 1-20 | 0.03 | 0.03 | −0.027 | −0.026 | −0.05 | 0.102 | 0.102 | 0.000 |
| 1-21 | 0.03 | 0.04 | −0.027 | −0.037 | −0.06 | 0.102 | 0.102 | 0.000 |
| 1-22 | 0.05 | 0.05 | −0.052 | −0.052 | −0.10 | 0.102 | 0.102 | 0.000 |
| 1-23 | 0.16 | 0.15 | −0.157 | −0.151 | −0.31 | 0.034 | 0.034 | 0.000 |
| 1-24 | 0.06 | 0.06 | −0.057 | −0.057 | −0.11 | 0.170 | 0.170 | 0.000 |
| 1-25 | 0.04 | 0.04 | −0.036 | −0.041 | −0.08 | 0.006 | 0.006 | 0.000 |
| 1-26 | 0.91 | 0.92 | −0.910 | −0.917 | −1.83 | 1.279 | 1.279 | 0.000 |
| 1-27 | 0.00 | 0.00 | 0.000 | 0.000 | 0.00 | 0.128 | 0.128 | 0.000 |
| 1-28 | 0.03 | 0.03 | −0.027 | −0.028 | −0.05 | 0.128 | 0.128 | 0.000 |
| 1-29 | 0.05 | 0.05 | −0.051 | −0.052 | −0.10 | 0.128 | 0.128 | 0.000 |
| 1-30 | 0.14 | 0.14 | −0.138 | −0.138 | −0.28 | 0.043 | 0.043 | 0.000 |
| 1-31 | 0.05 | 0.05 | −0.049 | −0.050 | −0.10 | 0.213 | 0.213 | 0.000 |
| 1-32 | −0.01 | −0.01 | 0.006 | 0.006 | 0.01 | 0.067 | 0.067 | 0.000 |

Des. Ex. No. = Design Example Number

TABLE 3-1

| Des. Ex. No. | $n_{FA}$ | $n_{FB}$ | $\theta_{FA}$ ° | $\theta_{FB}$ ° | $n_{LA}$ | $n_{LB}$ | $W_A$ | $W_B$ | $n_{0A}$ | $n_{0B}$ |
|---|---|---|---|---|---|---|---|---|---|---|
| 1-33 | 1.444 | 1.444 | 6.0 | 6.0 | 1.000 | 1.000 | 0.030 | 0.030 | 1.444 | 1.444 |
| 1-34 | 1.444 | 1.444 | 6.0 | 6.0 | 1.000 | 1.000 | 0.030 | 0.030 | 1.500 | 1.500 |
| 1-35 | 1.444 | 1.444 | 6.0 | 6.0 | 1.000 | 1.000 | 0.030 | 0.030 | 1.600 | 1.600 |
| 1-36 | 1.444 | 1.444 | 6.0 | 6.0 | 1.000 | 1.000 | 0.030 | 0.030 | 1.700 | 1.700 |
| 1-37 | 1.444 | 1.444 | 6.0 | 6.0 | 1.000 | 1.000 | 0.030 | 0.030 | 1.800 | 1.800 |
| 1-38 | 1.444 | 1.444 | 6.0 | 6.0 | 1.000 | 1.000 | 0.030 | 0.030 | 2.000 | 2.000 |
| 1-39 | 1.444 | 1.444 | 6.0 | 6.0 | 1.000 | 1.000 | 0.006 | 0.006 | 1.444 | 1.444 |
| 1-40 | 1.444 | 1.444 | 6.0 | 6.0 | 1.000 | 1.000 | 0.300 | 0.300 | 1.444 | 1.444 |
| 1-41 | 1.444 | 1.444 | 6.0 | 6.0 | 1.000 | 1.000 | 0.030 | 0.030 | 1.444 | 1.444 |
| 1-42 | 1.444 | 1.444 | 6.0 | 6.0 | 1.000 | 1.000 | 0.030 | 0.030 | 1.444 | 1.444 |
| 1-43 | 1.444 | 1.444 | 6.0 | 6.0 | 1.000 | 1.000 | 0.030 | 0.030 | 1.444 | 1.444 |
| 1-44 | 1.444 | 1.444 | 6.0 | 6.0 | 1.000 | 1.000 | 0.030 | 0.030 | 1.444 | 1.444 |
| 1-45 | 1.444 | 1.444 | 6.0 | 6.0 | 1.000 | 1.000 | 0.030 | 0.030 | 1.444 | 1.444 |
| 1-46 | 1.444 | 1.444 | 6.0 | 6.0 | 1.000 | 1.000 | 0.005 | 0.005 | 1.600 | 1.600 |
| 1-47 | 1.444 | 1.444 | 6.0 | 6.0 | 1.000 | 1.000 | 0.300 | 0.300 | 1.600 | 1.600 |
| 1-48 | 1.444 | 1.444 | 6.0 | 6.0 | 1.000 | 1.000 | 0.030 | 0.030 | 1.600 | 1.600 |
| 1-49 | 1.444 | 1.444 | 6.0 | 6.0 | 1.000 | 1.000 | 0.030 | 0.030 | 1.600 | 1.600 |
| 1-50 | 1.444 | 1.444 | 6.0 | 6.0 | 1.000 | 1.000 | 0.030 | 0.030 | 1.600 | 1.600 |
| 1-51 | 1.444 | 1.444 | 6.0 | 6.0 | 1.000 | 1.000 | 0.030 | 0.030 | 1.600 | 1.600 |
| 1-52 | 1.444 | 1.444 | 6.0 | 6.0 | 1.000 | 1.000 | 0.030 | 0.030 | 1.600 | 1.600 |
| 1-53 | 1.444 | 1.444 | 6.0 | 6.0 | 1.000 | 1.000 | 0.002 | 0.002 | 2.000 | 2.000 |
| 1-54 | 1.444 | 1.444 | 6.0 | 6.0 | 1.000 | 1.000 | 0.300 | 0.300 | 2.000 | 2.000 |
| 1-55 | 1.444 | 1.444 | 6.0 | 6.0 | 1.000 | 1.000 | 0.030 | 0.030 | 2.000 | 2.000 |
| 1-56 | 1.444 | 1.444 | 6.0 | 6.0 | 1.000 | 1.000 | 0.030 | 0.030 | 2.000 | 2.000 |
| 1-57 | 1.444 | 1.444 | 6.0 | 6.0 | 1.000 | 1.000 | 0.030 | 0.030 | 2.000 | 2.000 |
| 1-58 | 1.444 | 1.444 | 6.0 | 6.0 | 1.000 | 1.000 | 0.030 | 0.030 | 2.000 | 2.000 |
| 1-59 | 1.444 | 1.444 | 6.0 | 6.0 | 1.000 | 1.000 | 0.030 | 0.030 | 2.000 | 2.000 |
| 1-60 | 1.444 | 1.444 | 4.0 | 4.0 | 1.000 | 1.000 | 0.030 | 0.030 | 1.400 | 1.400 |
| 1-61 | 1.444 | 1.444 | 4.0 | 4.0 | 1.000 | 1.000 | 0.030 | 0.030 | 1.444 | 1.444 |
| 1-62 | 1.444 | 1.444 | 4.0 | 4.0 | 1.000 | 1.000 | 0.030 | 0.030 | 1.500 | 1.500 |
| 1-63 | 1.444 | 1.444 | 4.0 | 4.0 | 1.000 | 1.000 | 0.030 | 0.030 | 1.600 | 1.600 |
| 1-64 | 1.444 | 1.444 | 4.0 | 4.0 | 1.000 | 1.000 | 0.030 | 0.030 | 1.700 | 1.700 |

Des. Ex. No. = Design Example Number

TABLE 3-2

| Des. Ex. No. | $g_A$ | $g_B$ | $Z_A$ | $Z_B$ | L | $n_M$ | $\theta_{PA}$ ° | $\theta_{QA}$ ° | $\theta_{QB}$ ° | $\theta_{PB}$ ° |
|---|---|---|---|---|---|---|---|---|---|---|
| 1-33 | 0.600 | 0.600 | 2.574 | 2.574 | 1.0 | 1.0 | 5.94 | 0.00 | 0.00 | 5.94 |
| 1-34 | 0.600 | 0.600 | 2.572 | 2.572 | 1.0 | 1.0 | 5.27 | 0.00 | 0.00 | 5.27 |
| 1-35 | 0.600 | 0.600 | 2.569 | 2.569 | 1.0 | 1.0 | 4.39 | 0.00 | 0.00 | 4.39 |
| 1-36 | 0.600 | 0.600 | 2.566 | 2.566 | 1.0 | 1.0 | 3.76 | 0.00 | 0.00 | 3.76 |
| 1-37 | 0.600 | 0.600 | 2.563 | 2.563 | 1.0 | 1.0 | 3.29 | 0.00 | 0.00 | 3.29 |
| 1-38 | 0.600 | 0.600 | 2.557 | 2.557 | 1.0 | 1.0 | 2.62 | 0.00 | 0.00 | 2.62 |
| 1-39 | 0.600 | 0.600 | 2.61 | 2.61 | 1.0 | 1.0 | 6.00 | 0.00 | 0.00 | 5.98 |
| 1-40 | 0.600 | 0.600 | 2.188 | 2.188 | 1.0 | 1.0 | 5.77 | 0.00 | 0.00 | 5.77 |
| 1-41 | 0.600 | 0.600 | 2.574 | 2.574 | 0.0 | 1.0 | 6.00 | 0.00 | 0.00 | 6.00 |
| 1-42 | 0.600 | 0.600 | 2.574 | 2.574 | 10.0 | 1.0 | 5.40 | 0.00 | 0.00 | 5.40 |
| 1-43 | 0.600 | 0.600 | 2.574 | 2.574 | 30.0 | 1.0 | 4.50 | 0.00 | 0.00 | 4.50 |
| 1-44 | 0.200 | 0.200 | 7.81 | 7.81 | 1.0 | 1.0 | 5.99 | 0.00 | 0.00 | 5.99 |
| 1-45 | 1.000 | 1.000 | 1.527 | 1.527 | 1.0 | 1.0 | 5.83 | 0.00 | 0.00 | 5.83 |
| 1-46 | 0.600 | 0.600 | 2.61 | 2.61 | 1.0 | 1.0 | 4.45 | 0.00 | 0.00 | 4.43 |
| 1-47 | 0.600 | 0.600 | 2.144 | 2.144 | 1.0 | 1.0 | 4.24 | 0.00 | 0.00 | 4.24 |
| 1-48 | 0.600 | 0.600 | 2.569 | 2.569 | 0.0 | 1.0 | 4.45 | 0.00 | 0.00 | 4.45 |
| 1-49 | 0.600 | 0.600 | 2.569 | 2.569 | 10.0 | 1.0 | 3.91 | 0.00 | 0.00 | 3.91 |
| 1-50 | 0.600 | 0.600 | 2.569 | 2.569 | 30.0 | 1.0 | 3.15 | 0.00 | 0.00 | 3.16 |
| 1-51 | 0.200 | 0.200 | 7.806 | 7.806 | 1.0 | 1.0 | 4.44 | 0.00 | 0.00 | 4.44 |
| 1-52 | 1.000 | 1.000 | 1.522 | 1.522 | 1.0 | 1.0 | 4.30 | 0.00 | 0.00 | 4.30 |
| 1-53 | 0.600 | 0.600 | 2.613 | 2.613 | 1.0 | 1.0 | 2.69 | 0.00 | 0.00 | 2.66 |
| 1-54 | 0.600 | 0.600 | 2.033 | 2.033 | 1.0 | 1.0 | 2.49 | 0.00 | 0.00 | 2.49 |
| 1-55 | 0.600 | 0.600 | 2.557 | 2.557 | 0.0 | 1.0 | 2.68 | 0.00 | 0.00 | 2.68 |
| 1-56 | 0.600 | 0.600 | 2.557 | 2.557 | 10.0 | 1.0 | 2.20 | 0.00 | 0.00 | 2.21 |
| 1-57 | 0.600 | 0.600 | 2.557 | 2.557 | 30.0 | 1.0 | 1.63 | 0.00 | 0.00 | 1.64 |
| 1-58 | 0.200 | 0.200 | 7.793 | 7.793 | 1.0 | 1.0 | 2.67 | 0.00 | 0.00 | 2.67 |
| 1-59 | 1.000 | 1.000 | 1.51 | 1.51 | 1.0 | 1.0 | 2.53 | 0.00 | 0.00 | 2.53 |
| 1-60 | 0.600 | 0.600 | 2.575 | 2.575 | 1.0 | 1.0 | 4.39 | 0.00 | 0.00 | 4.39 |
| 1-61 | 0.600 | 0.600 | 2.574 | 2.574 | 1.0 | 1.0 | 3.96 | 0.00 | 0.00 | 3.96 |
| 1-62 | 0.600 | 0.600 | 2.572 | 2.572 | 1.0 | 1.0 | 3.51 | 0.00 | 0.00 | 3.96 |
| 1-63 | 0.600 | 0.600 | 2.568 | 2.568 | 1.0 | 1.0 | 2.93 | 0.00 | 0.00 | 2.93 |
| 1-64 | 0.600 | 0.600 | 2.566 | 2.566 | 1.0 | 1.0 | 2.50 | 0.00 | 0.00 | 2.50 |

Des. Ex. No. = Design Example Number

TABLE 3-3

| Des. Ex. No. | $\theta_{QA0}$ ° | $\theta_{QB0}$ ° | $\theta_{QA}-\theta_{QA0}$ ° | $\theta_{QB}-\theta_{QB0}$ ° | $(\theta_{QA} + \theta_{QB})-(\theta_{QA0} + \theta_{QB0})$ ° | $\theta_{3A}$ ° | $\theta_{3B}$ ° | $\theta_{3A}-\theta_{3B}$ ° |
|---|---|---|---|---|---|---|---|---|
| 1-33 | 0.01 | 0.01 | −0.011 | −0.011 | −0.02 | 0.069 | 0.069 | 0.000 |
| 1-34 | 0.02 | 0.02 | −0.024 | −0.019 | −0.04 | 0.072 | 0.072 | 0.000 |
| 1-35 | 0.03 | 0.03 | −0.030 | −0.030 | −0.06 | 0.077 | 0.077 | 0.000 |
| 1-36 | 0.03 | 0.03 | −0.031 | −0.031 | −0.06 | 0.082 | 0.082 | 0.000 |
| 1-37 | 0.03 | 0.03 | −0.030 | −0.030 | −0.06 | 0.086 | 0.086 | 0.000 |
| 1-38 | 0.03 | 0.03 | −0.026 | −0.026 | −0.05 | 0.096 | 0.096 | 0.000 |
| 1-39 | 0.03 | −0.03 | −0.026 | 0.027 | 0.00 | 0.013 | 0.013 | 0.000 |
| 1-40 | 1.02 | 1.02 | −1.017 | −1.017 | −2.03 | 0.692 | 0.692 | 0.000 |
| 1-41 | 0.00 | 0.00 | 0.000 | 0.000 | 0.00 | 0.069 | 0.069 | 0.000 |
| 1-42 | 0.02 | 0.02 | −0.017 | −0.017 | −0.03 | 0.069 | 0.069 | 0.000 |
| 1-43 | 0.04 | 0.04 | −0.040 | −0.040 | −0.08 | 0.069 | 0.069 | 0.000 |
| 1-44 | 0.00 | 0.00 | −0.004 | −0.004 | −0.01 | 0.023 | 0.023 | 0.000 |
| 1-45 | 0.03 | 0.02 | −0.029 | −0.018 | −0.05 | 0.115 | 0.115 | 0.000 |
| 1-46 | 0.04 | 0.00 | −0.040 | −−0.001 | 0.04 | 0.012 | 0.012 | 0.000 |
| 1-47 | 0.86 | 0.86 | −0.860 | −0.864 | −1.72 | 0.767 | 0.767 | 0.000 |
| 1-48 | 0.00 | 0.00 | 0.000 | 0.000 | 0.00 | 0.077 | 0.077 | 0.000 |
| 1-49 | 0.02 | 0.02 | −0.018 | −0.018 | −0.04 | 0.077 | 0.077 | 0.000 |
| 1-50 | 0.04 | 0.04 | −0.038 | −0.039 | −0.08 | 0.077 | 0.077 | 0.000 |
| 1-51 | 0.07 | 0.07 | −0.068 | −0.068 | −0.14 | 0.026 | 0.026 | 0.000 |
| 1-52 | 0.03 | 0.03 | −0.032 | −0.033 | −0.06 | 0.128 | 0.128 | 0.000 |
| 1-53 | 0.04 | −0.01 | −0.043 | 0.006 | −0.04 | 0.008 | 0.008 | 0.000 |
| 1-54 | 0.66 | 0.66 | −0.664 | −0.664 | −1.33 | 0.959 | 0.959 | 0.000 |
| 1-55 | 0.00 | 0.00 | 0.000 | 0.000 | 0.00 | 0.096 | 0.096 | 0.000 |
| 1-56 | 0.02 | 0.02 | −0.019 | −0.020 | −0.04 | 0.096 | 0.096 | 0.000 |
| 1-57 | 0.04 | 0.04 | −0.038 | −0.039 | −0.08 | 0.096 | 0.096 | 0.000 |
| 1-58 | 0.06 | 0.06 | −0.057 | −0.057 | −0.11 | 0.032 | 0.032 | 0.000 |
| 1-59 | 0.03 | 0.03 | −0.028 | −0.030 | −0.06 | 0.160 | 0.160 | 0.000 |
| 1-60 | 0.00 | 0.00 | −0.004 | −0.003 | −0.01 | 0.045 | 0.045 | 0.000 |
| 1-61 | 0.01 | 0.01 | −0.007 | −0.007 | −0.01 | 0.046 | 0.046 | 0.000 |
| 1-62 | 0.01 | 0.01 | −0.009 | −0.009 | −0.02 | 0.048 | 0.048 | 0.000 |

TABLE 3-3-continued

| Des. Ex. No. | $\theta_{QA0}$ ° | $\theta_{QB0}$ ° | $\theta_{QA}-\theta_{QA0}$ ° | $\theta_{QB}-\theta_{QB0}$ ° | $(\theta_{QA}+\theta_{QB})-(\theta_{QA0}+\theta_{QB0})$ ° | $\theta_{3A}$ ° | $\theta_{3B}$ ° | $\theta_{3A}-\theta_{3B}$ ° |
|---|---|---|---|---|---|---|---|---|
| 1-63 | 0.01 | 0.01 | −0.012 | −0.012 | −0.02 | 0.051 | 0.051 | 0.000 |
| 1-64 | 0.01 | 0.01 | −0.013 | −0.013 | −0.03 | 0.054 | 0.054 | 0.000 |

Des. Ex. No. = Design Example Number

TABLE 4-1

| Des. Ex. No. | $n_{FA}$ | $n_{FB}$ | $\theta_{FA}$ ° | $\theta_{FB}$ ° | $n_{LA}$ | $n_{LB}$ | $W_A$ | $W_B$ | $n_{0A}$ | $n_{0B}$ |
|---|---|---|---|---|---|---|---|---|---|---|
| 1-65 | 1.444 | 1.444 | 4.0 | 4.0 | 1.000 | 1.000 | 0.030 | 0.030 | 1.800 | 1.800 |
| 1-66 | 1.444 | 1.444 | 4.0 | 4.0 | 1.000 | 1.000 | 0.030 | 0.030 | 2.000 | 2.000 |
| 1-67 | 1.444 | 1.444 | 4.0 | 4.0 | 1.000 | 1.000 | 0.013 | 0.013 | 1.444 | 1.444 |
| 1-68 | 1.444 | 1.444 | 4.0 | 4.0 | 1.000 | 1.000 | 0.300 | 0.300 | 1.444 | 1.444 |
| 1-69 | 1.444 | 1.444 | 4.0 | 4.0 | 1.000 | 1.000 | 0.030 | 0.030 | 1.444 | 1.444 |
| 1-70 | 1.444 | 1.444 | 4.0 | 4.0 | 1.000 | 1.000 | 0.030 | 0.030 | 1.444 | 1.444 |
| 1-71 | 1.444 | 1.444 | 4.0 | 4.0 | 1.000 | 1.000 | 0.030 | 0.030 | 1.444 | 1.444 |
| 1-72 | 1.444 | 1.444 | 4.0 | 4.0 | 1.000 | 1.000 | 0.030 | 0.030 | 1.444 | 1.444 |
| 1-73 | 1.444 | 1.444 | 4.0 | 4.0 | 1.000 | 1.000 | 0.030 | 0.030 | 1.444 | 1.444 |
| 1-74 | 1.444 | 1.444 | 4.0 | 4.0 | 1.000 | 1.000 | 0.008 | 0.008 | 1.700 | 1.700 |
| 1-75 | 1.444 | 1.444 | 4.0 | 4.0 | 1.000 | 1.000 | 0.300 | 0.300 | 1.700 | 1.700 |
| 1-76 | 1.444 | 1.444 | 4.0 | 4.0 | 1.000 | 1.000 | 0.030 | 0.030 | 1.700 | 1.700 |
| 1-77 | 1.444 | 1.444 | 4.0 | 4.0 | 1.000 | 1.000 | 0.030 | 0.030 | 1.700 | 1.700 |
| 1-78 | 1.444 | 1.444 | 4.0 | 4.0 | 1.000 | 1.000 | 0.030 | 0.030 | 1.700 | 1.700 |
| 1-79 | 1.444 | 1.444 | 4.0 | 4.0 | 1.000 | 1.000 | 0.030 | 0.030 | 1.700 | 1.700 |
| 1-80 | 1.444 | 1.444 | 4.0 | 4.0 | 1.000 | 1.000 | 0.030 | 0.030 | 1.700 | 1.700 |
| 1-81 | 1.444 | 1.444 | 4.0 | 4.0 | 1.000 | 1.000 | 0.010 | 0.010 | 2.000 | 2.000 |
| 1-82 | 1.444 | 1.444 | 4.0 | 4.0 | 1.000 | 1.000 | 0.300 | 0.300 | 2.000 | 2.000 |
| 1-83 | 1.444 | 1.444 | 4.0 | 4.0 | 1.000 | 1.000 | 0.030 | 0.030 | 2.000 | 2.000 |
| 1-84 | 1.444 | 1.444 | 4.0 | 4.0 | 1.000 | 1.000 | 0.030 | 0.030 | 2.000 | 2.000 |
| 1-85 | 1.444 | 1.444 | 4.0 | 4.0 | 1.000 | 1.000 | 0.030 | 0.030 | 2.000 | 2.000 |
| 1-86 | 1.444 | 1.444 | 4.0 | 4.0 | 1.000 | 1.000 | 0.030 | 0.030 | 2.000 | 2.000 |
| 1-87 | 1.444 | 1.444 | 4.0 | 4.0 | 1.000 | 1.000 | 0.030 | 0.030 | 2.000 | 2.000 |
| 1-88 | 1.444 | 1.444 | 15.0 | 15.0 | 1.000 | 1.000 | 0.030 | 0.030 | 1.400 | 1.400 |
| 1-89 | 1.444 | 1.444 | 15.0 | 15.0 | 1.000 | 1.000 | 0.030 | 0.030 | 1.444 | 1.444 |
| 1-90 | 1.444 | 1.444 | 15.0 | 15.0 | 1.000 | 1.000 | 0.030 | 0.030 | 1.500 | 1.500 |
| 1-91 | 1.444 | 1.444 | 15.0 | 15.0 | 1.000 | 1.000 | 0.030 | 0.030 | 1.600 | 1.600 |
| 1-92 | 1.444 | 1.444 | 15.0 | 15.0 | 1.000 | 1.000 | 0.030 | 0.030 | 1.700 | 1.700 |
| 1-93 | 1.444 | 1.444 | 15.0 | 15.0 | 1.000 | 1.000 | 0.030 | 0.030 | 1.800 | 1.800 |
| 1-94 | 1.444 | 1.444 | 15.0 | 15.0 | 1.000 | 1.000 | 0.030 | 0.030 | 2.000 | 2.000 |
| 1-95 | 1.444 | 1.444 | 15.0 | 15.0 | 1.000 | 1.000 | 0.013 | 0.013 | 1.444 | 1.444 |
| 1-96 | 1.444 | 1.444 | 15.0 | 15.0 | 1.000 | 1.000 | 0.100 | 0.100 | 1.444 | 1.444 |

Des. Ex. No. = Design Example Number

TABLE 4-2

| Des. Ex. No. | $g_A$ | $g_B$ | $Z_A$ | $Z_B$ | $L$ | $n_M$ | $\theta_{PA}$ ° | $\theta_{QA}$ ° | $\theta_{QB}$ ° | $\theta_{PB}$ ° |
|---|---|---|---|---|---|---|---|---|---|---|
| 1-65 | 0.600 | 0.600 | 2.563 | 2.563 | 1.0 | 1.0 | 2.19 | 0.00 | 0.00 | 2.19 |
| 1-66 | 0.600 | 0.600 | 2.557 | 2.557 | 1.0 | 1.0 | 1.74 | 0.00 | 0.00 | 1.74 |
| 1-67 | 0.600 | 0.600 | 2.599 | 2.599 | 1.0 | 1.0 | 3.99 | 0.00 | 0.00 | 3.99 |
| 1-68 | 0.600 | 0.600 | 2.19 | 2.19 | 1.0 | 1.0 | 3.84 | 0.00 | 0.00 | 3.84 |
| 1-69 | 0.600 | 0.600 | 2.574 | 2.574 | 0.0 | 1.0 | 4.00 | 0.00 | 0.00 | 4.00 |
| 1-70 | 0.600 | 0.600 | 2.574 | 2.574 | 10.0 | 1.0 | 3.60 | 0.00 | 0.00 | 3.60 |
| 1-71 | 0.600 | 0.600 | 2.574 | 2.574 | 30.0 | 1.0 | 3.00 | 0.00 | 0.00 | 3.00 |
| 1-72 | 0.200 | 0.200 | 7.8 | 7.81 | 1.0 | 1.0 | 4.00 | 0.00 | 0.00 | 4.00 |
| 1-73 | 1.000 | 1.000 | 1.527 | 1.527 | 1.0 | 1.0 | 3.89 | 0.00 | 0.00 | 3.89 |
| 1-74 | 0.600 | 0.600 | 2.605 | 2.605 | 1.0 | 1.0 | 2.53 | 0.00 | 0.00 | 2.53 |
| 1-75 | 0.600 | 0.600 | 2.118 | 2.118 | 1.0 | 1.0 | 2.40 | 0.00 | 0.00 | 2.41 |
| 1-76 | 0.600 | 0.600 | 2.566 | 2.566 | 0.0 | 1.0 | 2.54 | 0.00 | 0.00 | 2.54 |
| 1-77 | 0.600 | 0.600 | 2.566 | 2.566 | 10.0 | 1.0 | 2.20 | 0.00 | 0.00 | 2.20 |
| 1-78 | 0.600 | 0.600 | 2.566 | 2.566 | 30.0 | 1.0 | 1.73 | 0.00 | 0.00 | 1.73 |
| 1-79 | 0.200 | 0.200 | 7.802 | 7.802 | 1.0 | 1.0 | 2.54 | 0.00 | 0.00 | 2.54 |
| 1-80 | 1.000 | 1.000 | 1.519 | 1.519 | 1.0 | 1.0 | 2.44 | 0.00 | 0.00 | 2.44 |
| 1-81 | 0.600 | 0.600 | 2.597 | 2.597 | 1.0 | 1.0 | 1.77 | 0.00 | 0.00 | 1.77 |
| 1-82 | 0.600 | 0.600 | 2.035 | 2.035 | 1.0 | 1.0 | 1.65 | 0.00 | 0.00 | 1.66 |
| 1-83 | 0.600 | 0.600 | 2.556 | 2.556 | 0.0 | 1.0 | 1.77 | 0.00 | 0.00 | 1.77 |
| 1-84 | 0.600 | 0.600 | 2.557 | 2.557 | 10.0 | 1.0 | 1.46 | 0.00 | 0.00 | 1.46 |
| 1-85 | 0.600 | 0.600 | 2.557 | 2.557 | 30.0 | 1.0 | 1.09 | 0.00 | 0.00 | 1.08 |

TABLE 4-2-continued

| Des. Ex. No. | $g_A$ | $g_B$ | $Z_A$ | $Z_B$ | L | $n_M$ | $\theta_{PA}$ ° | $\theta_{QA}$ ° | $\theta_{QB}$ ° | $\theta_{PB}$ ° |
|---|---|---|---|---|---|---|---|---|---|---|
| 1-86 | 0.200 | 0.200 | 7.793 | 7.793 | 1.0 | 1.0 | 1.78 | 0.00 | 0.00 | 1.78 |
| 1-87 | 1.000 | 1.000 | 1.51 | 1.51 | 1.0 | 1.0 | 1.69 | 0.00 | 0.00 | 1.69 |
| 1-88 | 0.600 | 0.600 | 2.572 | 2.572 | 1.0 | 1.0 | 16.38 | 0.00 | 0.00 | 16.37 |
| 1-89 | 0.600 | 0.600 | 2.57 | 2.57 | 1.0 | 1.0 | 14.85 | 0.00 | 0.00 | 14.84 |
| 1-90 | 0.600 | 0.600 | 2.569 | 2.569 | 1.0 | 1.0 | 13.26 | 0.00 | 0.00 | 13.25 |
| 1-91 | 0.600 | 0.600 | 2.566 | 2.566 | 1.0 | 1.0 | 11.12 | 0.00 | 0.00 | 11.12 |
| 1-92 | 0.600 | 0.600 | 2.563 | 2.563 | 1.0 | 1.0 | 9.56 | 0.00 | 0.00 | 9.56 |
| 1-93 | 0.600 | 0.600 | 2.56 | 2.56 | 1.0 | 1.0 | 8.38 | 0.00 | 0.00 | 8.38 |
| 1-94 | 0.600 | 0.600 | 2.554 | 2.554 | 1.0 | 1.0 | 6.71 | 0.00 | 0.00 | 6.71 |
| 1-95 | 0.600 | 0.600 | 2.616 | 2.616 | 1.0 | 1.0 | 14.96 | 0.00 | 0.00 | 15.04 |
| 1-96 | 0.600 | 0.600 | 2.461 | 2.461 | 1.0 | 1.0 | 14.59 | 0.00 | 0.00 | 14.57 |

Des. Ex. No. = Design Example Number

TABLE 4-3

| Des. Ex. No. | $\theta_{QA0}$ ° | $\theta_{QB0}$ ° | $\theta_{QA}-\theta_{QA0}$ | $\theta_{QB}-\theta_{QB0}$ | $(\theta_{QA}+\theta_{QB})-(\theta_{QA0}+\theta_{QB0})$ | $\theta_{3A}$ | $\theta_{3B}$ | $\theta_{3A}-\theta_{3B}$ |
|---|---|---|---|---|---|---|---|---|
| 1-65 | 0.01 | 0.01 | −0.007 | −0.007 | −0.01 | 0.058 | 0.058 | 0.000 |
| 1-66 | 0.01 | 0.01 | −0.011 | −0.011 | −0.02 | 0.064 | 0.064 | 0.000 |
| 1-67 | 0.02 | 0.02 | −0.017 | −0.017 | −0.03 | 0.020 | 0.020 | 0.000 |
| 1-68 | 0.67 | 0.67 | −0.673 | −0.673 | −1.35 | 0.462 | 0.462 | 0.000 |
| 1-69 | 0.00 | 0.00 | 0.000 | 0.000 | 0.00 | 0.046 | 0.046 | 0.000 |
| 1-70 | 0.01 | 0.01 | −0.011 | −0.011 | −0.02 | 0.046 | 0.046 | 0.000 |
| 1-71 | 0.03 | 0.03 | −0.027 | −0.027 | −0.05 | 0.046 | 0.046 | 0.000 |
| 1-72 | 0.01 | 0.01 | −0.007 | −0.007 | −0.01 | 0.015 | 0.015 | 0.000 |
| 1-73 | 0.02 | 0.02 | −0.015 | −0.015 | −0.03 | 0.077 | 0.077 | 0.000 |
| 1-74 | 0.00 | 0.01 | −0.001 | −0.011 | −0.01 | 0.014 | 0.014 | 0.000 |
| 1-75 | 0.52 | 0.52 | −0.515 | −0.521 | −1.04 | 0.543 | 0.543 | 0.000 |
| 1-76 | 0.00 | 0.00 | 0.000 | 0.000 | 0.00 | 0.054 | 0.054 | 0.000 |
| 1-77 | 0.01 | 0.01 | −0.012 | −0.012 | −0.02 | 0.054 | 0.054 | 0.000 |
| 1-78 | 0.03 | 0.03 | −0.025 | −0.025 | −0.05 | 0.054 | 0.054 | 0.000 |
| 1-79 | 0.02 | 0.02 | −0.019 | −0.019 | −0.04 | 0.018 | 0.018 | 0.000 |
| 1-80 | 0.02 | 0.02 | −0.016 | −0.016 | −0.03 | 0.091 | 0.091 | 0.000 |
| 1-81 | 0.01 | 0.01 | −0.006 | −0.006 | −0.01 | 0.021 | 0.021 | 0.000 |
| 1-82 | 0.43 | 0.45 | −0.429 | −0.446 | −0.88 | 0.639 | 0.639 | 0.000 |
| 1-83 | 0.00 | 0.00 | 0.000 | 0.000 | 0.00 | 0.064 | 0.064 | 0.000 |
| 1-84 | 0.01 | 0.01 | −0.012 | −0.012 | −0.02 | 0.064 | 0.064 | 0.000 |
| 1-85 | 0.03 | 0.03 | −0.026 | −0.025 | −0.05 | 0.064 | 0.064 | 0.000 |
| 1-86 | 0.02 | 0.02 | −0.016 | −0.016 | −0.03 | 0.021 | 0.021 | 0.000 |
| 1-87 | 0.02 | 0.02 | −0.016 | −0.016 | −0.03 | 0.107 | 0.107 | 0.000 |
| 1-88 | −0.22 | −0.24 | 0.219 | 0.242 | 0.46 | 0.168 | 0.168 | 0.000 |
| 1-89 | 0.04 | 0.03 | −0.044 | −0.025 | −0.07 | 0.173 | 0.173 | 0.000 |
| 1-90 | 0.23 | 0.21 | −0.229 | −0.213 | −0.44 | 0.180 | 0.180 | 0.000 |
| 1-91 | 0.36 | 0.35 | −0.361 | −0.351 | −0.71 | 0.192 | 0.192 | 0.000 |
| 1-92 | 0.39 | 0.38 | −0.389 | −0.381 | −0.77 | 0.204 | 0.204 | 0.000 |
| 1-93 | 0.38 | 0.38 | −0.375 | −0.375 | −0.75 | 0.216 | 0.216 | 0.000 |
| 1-94 | 0.32 | 0.32 | −0.323 | −0.320 | −0.64 | 0.240 | 0.240 | 0.000 |
| 1-95 | 0.07 | 0.25 | −0.065 | −0.250 | −0.31 | 0.075 | 0.075 | 0.000 |
| 1-96 | 0.36 | 0.31 | −0.362 | −0.309 | −0.67 | 0.577 | 0.577 | 0.000 |

Des. Ex. No. = Design Example Number

TABLE 5-1

| Des. Ex. No. | $n_{FA}$ | $n_{FB}$ | $\theta_{FA}$ ° | $\theta_{FB}$ ° | $n_{LA}$ | $n_{LB}$ | $W_A$ | $W_B$ | $n_{0A}$ | $n_{0B}$ |
|---|---|---|---|---|---|---|---|---|---|---|
| 1-97 | 1.444 | 1.444 | 15.0 | 15.0 | 1.000 | 1.000 | 0.030 | 0.030 | 1.444 | 1.444 |
| 1-98 | 1.444 | 1.444 | 15.0 | 15.0 | 1.000 | 1.000 | 0.030 | 0.030 | 1.444 | 1.444 |
| 1-99 | 1.444 | 1.444 | 15.0 | 15.0 | 1.000 | 1.000 | 0.030 | 0.030 | 1.444 | 1.444 |
| 1-100 | 1.444 | 1.444 | 15.0 | 15.0 | 1.000 | 1.000 | 0.030 | 0.030 | 1.444 | 1.444 |
| 1-101 | 1.444 | 1.444 | 15.0 | 15.0 | 1.000 | 1.000 | 0.010 | 0.010 | 1.700 | 1.700 |
| 1-102 | 1.444 | 1.444 | 15.0 | 15.0 | 1.000 | 1.000 | 0.100 | 0.100 | 1.700 | 1.700 |
| 1-103 | 1.444 | 1.444 | 15.0 | 15.0 | 1.000 | 1.000 | 0.030 | 0.030 | 1.700 | 1.700 |
| 1-104 | 1.444 | 1.444 | 15.0 | 15.0 | 1.000 | 1.000 | 0.030 | 0.030 | 1.700 | 1.700 |
| 1-105 | 1.444 | 1.444 | 15.0 | 15.0 | 1.000 | 1.000 | 0.030 | 0.030 | 1.700 | 1.700 |
| 1-106 | 1.444 | 1.444 | 15.0 | 15.0 | 1.000 | 1.000 | 0.030 | 0.030 | 1.700 | 1.700 |
| 1-107 | 1.444 | 1.444 | 15.0 | 15.0 | 1.000 | 1.000 | 0.010 | 0.010 | 2.000 | 2.000 |
| 1-108 | 1.444 | 1.444 | 15.0 | 15.0 | 1.000 | 1.000 | 0.100 | 0.100 | 2.000 | 2.000 |

TABLE 5-1-continued

| Des. Ex. No. | $n_{FA}$ | $n_{FB}$ | $\theta_{FA}$ ° | $\theta_{FB}$ ° | $n_{LA}$ | $n_{LB}$ | $W_A$ | $W_B$ | $n_{0A}$ | $n_{0B}$ |
|---|---|---|---|---|---|---|---|---|---|---|
| 1-109 | 1.444 | 1.444 | 15.0 | 15.0 | 1.000 | 1.000 | 0.030 | 0.030 | 2.000 | 2.000 |
| 1-110 | 1.444 | 1.444 | 15.0 | 15.0 | 1.000 | 1.000 | 0.030 | 0.030 | 2.000 | 2.000 |
| 1-111 | 1.444 | 1.444 | 15.0 | 15.0 | 1.000 | 1.000 | 0.030 | 0.030 | 2.000 | 2.000 |
| 1-112 | 1.444 | 1.444 | 15.0 | 15.0 | 1.000 | 1.000 | 0.030 | 0.030 | 2.000 | 2.000 |
| 1-113 | 1.530 | 1.450 | 8.0 | 8.0 | 1.000 | 1.000 | 0.030 | 0.053 | 1.590 | 1.590 |
| 1-114 | 1.400 | 1.600 | 4.0 | 4.0 | 1.000 | 1.000 | 0.090 | 0.030 | 1.800 | 1.600 |
| 1-115 | 1.440 | 1.600 | 4.0 | 8.0 | 1.000 | 1.000 | 0.030 | 0.056 | 2.000 | 1.500 |
| 1-116 | 1.450 | 1.600 | 4.0 | 8.0 | 1.000 | 1.000 | 0.030 | 0.038 | 1.500 | 1.700 |
| 1-117 | 1.530 | 1.450 | 8.0 | 6.0 | 1.000 | 1.000 | 0.030 | 0.072 | 1.590 | 1.590 |
| 1-118 | 1.444 | 1.444 | 8.0 | 8.0 | 1.500 | 1.500 | 0.081 | 0.081 | 1.600 | 1.600 |
| 1-119 | 1.444 | 1.444 | 8.0 | 8.0 | 1.444 | 1.444 | 0.092 | 0.247 | 1.600 | 1.600 |
| 1-120 | 1.444 | 1.444 | 6.0 | 6.0 | 1.744 | 1.744 | 0.010 | 0.010 | 1.520 | 1.520 |
| 1-121 | 1.444 | 1.444 | 8.0 | 8.0 | 1.000 | 1.000 | 0.070 | 0.070 | 1.600 | 1.600 |
| 1-122 | 1.444 | 1.444 | 6.0 | 6.0 | 1.000 | 1.000 | 0.066 | 0.066 | 1.600 | 1.600 |
| 1-123 | 1.444 | 1.444 | 15.0 | 15.0 | 1.000 | 1.000 | 0.030 | 0.030 | 1.600 | 1.600 |
| 1-124 | 1.444 | 1.444 | 4.0 | 4.0 | 1.000 | 1.000 | 0.100 | 0.100 | 1.600 | 1.600 |
| 1-125 | 1.444 | 1.444 | 8.0 | 8.0 | 1.000 | 1.000 | 0.030 | 0.030 | 1.500 | 1.500 |
| 1-126 | 1.444 | 1.444 | 8.0 | 8.0 | 1.000 | 1.000 | 0.100 | 0.100 | 2.000 | 2.000 |
| 1-127 | 1.444 | 1.444 | 8.0 | 8.0 | 1.000 | 1.000 | 0.100 | 0.100 | 1.600 | 1.600 |
| 1-128 | 1.444 | 1.444 | 8.0 | 8.0 | 1.000 | 1.000 | 0.030 | 0.030 | 1.600 | 1.600 |

Des. Ex. No. = Design Example Number

TABLE 5-2

| Des. Ex. No. | $g_A$ | $g_B$ | $Z_A$ | $Z_B$ | L | $n_M$ | $\theta_{PA}$ ° | $\theta_{QA}$ ° | $\theta_{QB}$ ° | $\theta_{PB}$ ° |
|---|---|---|---|---|---|---|---|---|---|---|
| 1-97 | 0.600 | 0.600 | 2.57 | 2.57 | 0.0 | 1.0 | 15.01 | 0.00 | 0.00 | 15.01 |
| 1-98 | 0.600 | 0.600 | 2.571 | 2.571 | 10.0 | 1.0 | 13.54 | 0.00 | 0.00 | 13.48 |
| 1-99 | 0.200 | 0.200 | 7.806 | 7.806 | 1.0 | 1.0 | 14.98 | 0.00 | 0.00 | 14.98 |
| 1-100 | 1.000 | 1.000 | 1.523 | 1.523 | 1.0 | 1.0 | 14.59 | 0.00 | 0.00 | 14.57 |
| 1-101 | 0.600 | 0.600 | 2.599 | 2.599 | 1.0 | 1.0 | 9.65 | 0.00 | 0.00 | 9.65 |
| 1-102 | 0.600 | 0.600 | 2.437 | 2.437 | 1.0 | 1.0 | 9.33 | 0.00 | 0.00 | 9.32 |
| 1-103 | 0.600 | 0.600 | 2.563 | 2.563 | 0.0 | 1.0 | 9.71 | 0.00 | 0.00 | 9.71 |
| 1-104 | 0.600 | 0.600 | 2.564 | 2.564 | 10.0 | 1.0 | 8.41 | 0.00 | 0.00 | 8.39 |
| 1-105 | 0.200 | 0.200 | 7.799 | 7.799 | 1.0 | 1.0 | 9.69 | 0.00 | 0.00 | 9.69 |
| 1-106 | 1.000 | 1.000 | 1.516 | 1.516 | 1.0 | 1.0 | 9.33 | 0.00 | 0.00 | 9.32 |
| 1-107 | 0.600 | 0.600 | 2.596 | 2.596 | 1.0 | 1.0 | 6.80 | 0.00 | 0.00 | 6.80 |
| 1-108 | 0.600 | 0.600 | 2.408 | 2.408 | 1.0 | 1.0 | 6.48 | 0.00 | 0.00 | 6.48 |
| 1-109 | 0.600 | 0.600 | 2.554 | 2.554 | 0.0 | 1.0 | 6.86 | 0.00 | 0.00 | 6.86 |
| 1-110 | 0.600 | 0.600 | 2.554 | 2.554 | 10.0 | 1.0 | 5.64 | 0.00 | 0.00 | 5.63 |
| 1-111 | 0.200 | 0.200 | 7.79 | 7.79 | 1.0 | 1.0 | 6.83 | 0.00 | 0.00 | 6.83 |
| 1-112 | 1.000 | 1.000 | 1.507 | 1.507 | 1.0 | 1.0 | 6.48 | 0.00 | 0.00 | 6.48 |
| 1-113 | 0.600 | 0.400 | 2.569 | 3.841 | 1.0 | 1.0 | 7.11 | 0.00 | 0.00 | 6.07 |
| 1-114 | 0.400 | 1.000 | 3.765 | 1.521 | 10.0 | 1.0 | 1.63 | 0.00 | 0.00 | 2.89 |
| 1-115 | 0.800 | 0.200 | 1.903 | 7.76 | 1.0 | 1.0 | 1.72 | 0.00 | 0.00 | 9.54 |
| 1-116 | 0.800 | 0.200 | 1.918 | 7.773 | 1.0 | 1.0 | 3.53 | 0.00 | 0.00 | 6.86 |
| 1-117 | 0.600 | 0.400 | 2.568 | 3.812 | 1.0 | 1.0 | 7.11 | 0.00 | 0.00 | 4.53 |
| 1-118 | 0.600 | 0.600 | 2.532 | 2.532 | 1.0 | 1.0 | −4.40 | 0.00 | 0.00 | −4.40 |
| 1-119 | 0.600 | 0.600 | 2.516 | 2.347 | 1.0 | 1.0 | 0.00 | 0.00 | 0.00 | 0.00 |
| 1-120 | 0.600 | 0.600 | 2.609 | 2.609 | 1.0 | 1.0 | 8.00 | 0.00 | 0.00 | 8.00 |
| 1-121 | 0.600 | 0.600 | 2.508 | 2.506 | 1.0 | 1.0 | 8.00 | 4.80 | 4.80 | 8.00 |
| 1-122 | 0.600 | 0.600 | 2.514 | 2.512 | 1.0 | 1.0 | 6.00 | 3.58 | 3.58 | 6.00 |
| 1-123 | 0.600 | 0.600 | 2.583 | 2.575 | 1.0 | 1.0 | 15.00 | 8.47 | 8.49 | 15.00 |
| 1-124 | 0.600 | 0.600 | 2.458 | 2.456 | 1.0 | 1.0 | 4.00 | 2.48 | 2.48 | 4.00 |
| 1-125 | 0.600 | 0.600 | 2.572 | 2.572 | 1.0 | 1.0 | 8.00 | 2.21 | 2.21 | 8.00 |
| 1-126 | 0.600 | 0.600 | 2.437 | 2.425 | 1.0 | 1.0 | 8.00 | 7.96 | 7.99 | 8.00 |
| 1-127 | 0.200 | 0.200 | 7.701 | 7.695 | 4.0 | 1.0 | 8.00 | 3.50 | 3.50 | 8.00 |
| 1-128 | 1.000 | 1.000 | 1.523 | 1.522 | 1.0 | 1.0 | 8.00 | 2.98 | 2.98 | 8.00 |

Des. Ex. No. = Design Example Number

TABLE 5-3

| Des. Ex. No. | $\theta_{QA0}$ ° | $\theta_{QB0}$ ° | $\theta_{QA}-\theta_{QA0}$ ° | $\theta_{QB}-\theta_{QB0}$ ° | $(\theta_{QA} + \theta_{QB})-(\theta_{QA0} + \theta_{QB0})$ ° | $\theta_{3A}$ ° | $\theta_{3B}$ ° | $\theta_{3A}-\theta_{3B}$ ° |
|---|---|---|---|---|---|---|---|---|
| 1-97 | 0.00 | 0.00 | 0.000 | 0.000 | 0.00 | 0.173 | 0.173 | 0.000 |
| 1-98 | 0.05 | 0.04 | −0.053 | −0.039 | −0.09 | 0.173 | 0.173 | 0.000 |
| 1-99 | 0.01 | 0.01 | 0.012 | −0.012 | −0.02 | 0.058 | 0.058 | 0.000 |

TABLE 5-3-continued

| Des. Ex. No. | $\theta_{QA0}$ ° | $\theta_{QB0}$ ° | $\theta_{QA}-\theta_{QA0}$ ° | $\theta_{QB}-\theta_{QB0}$ ° | $(\theta_{QA}+\theta_{QB})-(\theta_{QA0}+\theta_{QB0})$ ° | $\theta_{3A}$ ° | $\theta_{3B}$ ° | $\theta_{3A}-\theta_{3B}$ ° |
|---|---|---|---|---|---|---|---|---|
| 1-100 | 0.08 | 0.05 | −0.081 | −0.054 | −0.13 | 0.289 | 0.289 | 0.000 |
| 1-101 | 0.37 | 0.37 | −0.371 | −0.367 | −0.74 | 0.068 | 0.068 | 0.000 |
| 1-102 | 0.61 | 0.59 | −0.607 | −0.590 | −1.20 | 0.679 | 0.679 | 0.000 |
| 1-103 | 0.00 | 0.00 | 0.000 | 0.000 | 0.00 | 0.204 | 0.204 | 0.000 |
| 1-104 | 0.08 | 0.07 | −0.075 | −0.071 | −0.15 | 0.204 | 0.204 | 0.000 |
| 1-105 | 1.11 | 1.11 | −1.113 | −1.107 | −2.22 | 0.068 | 0.068 | 0.000 |
| 1-106 | 0.26 | 0.26 | −0.265 | −0.255 | −0.52 | 0.340 | 0.340 | 0.000 |
| 1-107 | 0.31 | 0.31 | −0.310 | −0.310 | −0.62 | 0.080 | 0.080 | 0.000 |
| 1-108 | 0.50 | 0.50 | −0.504 | −0.498 | −1.00 | 0.799 | 0.799 | 0.000 |
| 1-109 | 0.00 | 0.00 | 0.000 | 0.000 | 0.00 | 0.240 | 0.240 | 0.000 |
| 1-110 | 0.07 | 0.07 | −0.070 | −0.068 | −0.14 | 0.240 | 0.240 | 0.000 |
| 1-111 | 0.93 | 0.93 | −0.930 | −0.930 | −1.86 | 0.080 | 0.080 | 0.000 |
| 1-112 | 0.22 | 0.22 | −0.222 | −0.218 | −0.44 | 0.400 | 0.400 | 0.000 |
| 1-113 | 0.04 | 0.10 | −0.041 | −0.096 | −0.14 | 0.121 | 0.121 | 0.000 |
| 1-114 | 0.03 | 0.05 | −0.027 | −0.053 | −0.08 | 0.103 | 0.115 | −0.012 |
| 1-115 | 0.03 | −0.23 | −0.031 | 0.235 | 0.20 | 0.084 | 0.080 | 0.004 |
| 1-116 | 0.01 | 0.11 | −0.013 | −0.110 | −0.12 | 0.065 | 0.062 | 0.003 |
| 1-117 | 0.04 | 0.06 | −0.041 | −0.063 | −0.10 | 0.121 | 0.123 | −0.001 |
| 1-118 | −0.01 | −0.01 | 0.010 | 0.010 | 0.02 | −0.023 | −0.023 | 0.000 |
| 1-119 | 0.00 | 0.00 | 0.000 | 0.000 | 0.00 | 0.000 | 0.000 | 0.000 |
| 1-120 | 0.02 | 0.02 | −0.020 | −0.020 | −0.04 | −0.009 | −0.009 | 0.000 |
| 1-121 | 4.73 | 4.73 | 0.067 | 0.069 | 0.14 | −2.640 | −2.641 | 0.002 |
| 1-122 | 3.53 | 3.53 | 0.052 | 0.053 | 0.10 | −1.981 | −1.982 | 0.001 |
| 1-123 | 8.44 | 8.44 | 0.027 | 0.043 | 0.07 | −4.891 | −0.901 | 0.010 |
| 1-124 | 2.45 | 2.45 | 0.031 | 0.031 | 0.06 | −1.318 | −1.319 | 0.000 |
| 1-125 | 2.18 | 2.18 | 0.025 | 0.025 | 0.05 | −1.008 | −1.008 | 0.000 |
| 1-126 | 7.84 | 7.84 | 0.124 | 0.154 | 0.28 | −7.538 | −7.568 | 0.030 |
| 1-127 | 3.44 | 3.44 | 0.061 | 0.063 | 0.12 | −1.986 | −1.988 | 0.001 |
| 1-128 | 2.88 | 2.88 | 0.093 | 0.094 | 0.19 | −1.616 | −1.616 | 0.000 |

Des. Ex. No. = Design Example Number

TABLE 6-1

| Des. Ex. No. | $n_{FA}$ | $n_{FB}$ | $\theta_{FA}$ ° | $\theta_{FB}$ ° | $n_{LA}$ | $n_{LB}$ | $W_A$ | $W_B$ | $n_{0A}$ | $n_{0B}$ |
|---|---|---|---|---|---|---|---|---|---|---|
| 2-1 | 1.444 | 1.444 | 8.0 | −8.0 | 1.000 | 1.000 | 0.030 | 0.030 | 1.600 | 1.600 |
| 2-2 | 1.450 | 1.600 | 5.0 | −4.0 | 1.000 | 1.000 | 0.030 | 0.043 | 1.700 | 1.750 |
| 2-3 | 1.444 | 1.444 | 8.0 | −8.0 | 1.000 | 1.000 | 0.030 | 0.030 | 1.600 | 1.600 |
| 2-4 | 1.444 | 1.444 | 8.0 | −8.0 | 1.000 | 1.000 | 0.030 | 0.030 | 1.450 | 1.450 |
| 2-5 | 1.444 | 1.444 | 6.0 | −6.0 | 1.000 | 1.000 | 0.030 | 0.030 | 2.000 | 2.000 |
| 2-6 | 1.444 | 1.440 | 6.0 | −6.0 | 1.000 | 1.000 | 0.030 | 0.249 | 1.600 | 1.600 |

Des. Ex. No. = Design Example Number

TABLE 6-2

| Des. Ex. No. | $g_A$ | $g_B$ | $Z_A$ | $Z_B$ | L | $n_M$ | $\theta_{PA}$ ° | $\theta_{QA}$ ° | $\theta_{QB}$ ° | $\theta_{PB}$ ° |
|---|---|---|---|---|---|---|---|---|---|---|
| 2-1 | 0.600 | 0.600 | 2.57 | 2.57 | 1.0 | 1.0 | 0.00 | 0.00 | 0.00 | 0.00 |
| 2-2 | 0.193 | 0.200 | 8.078 | 7.778 | 1.0 | 1.0 | 0.00 | 0.00 | 0.00 | 0.00 |
| 2-3 | 0.600 | 0.600 | 2.568 | 2.568 | 1.0 | 1.0 | 8.00 | 0.24 | −0.24 | −8.00 |
| 2-4 | 0.600 | 0.600 | 2.573 | 2.573 | 20.0 | 1.0 | 8.00 | 0.21 | −0.21 | −8.00 |
| 2-5 | 0.600 | 0.600 | 2.557 | 2.557 | 8.0 | 1.0 | 6.00 | 0.22 | −0.22 | −6.00 |
| 2-6 | 0.600 | 1.000 | 2.560 | 1.082 | 10.0 | 1.0 | 6.00 | 0.17 | −3.03 | −8.00 |

Des. Ex. No. = Design Example Number

TABLE 6-3

| Des. Ex. No. | $\theta_{QA0}$ ° | $\theta_{QB0}$ ° | $\theta_{QA}-\theta_{QA0}$ ° | $\theta_{QB}-\theta_{QB0}$ ° |
|---|---|---|---|---|
| 2-1 | 0.00 | 0.00 | 0.000 | 0.000 |
| 2-2 | 0.00 | 0.00 | 0.000 | 0.000 |
| 2-3 | 0.23 | −0.23 | 0.006 | −0.008 |
| 2-4 | 0.21 | −0.21 | 0.005 | −0.004 |

TABLE 6-3-continued

| Des. Ex. No. | $\theta_{QA0}$ ° | $\theta_{QB0}$ ° | $\theta_{QA} - \theta_{QA0}$ ° | $\theta_{QB} - \theta_{QB0}$ ° |
|---|---|---|---|---|
| 2-5 | 0.22 | −0.22 | 0.005 | −0.005 |
| 2-6 | 0.17 | −3.19 | 0.001 | 0.156 |

Des. Ex. No. = Design Example Number

In Design Examples 3-1 to 3-6 shown in Tables 7 to 9 below and Reference Examples 1 and 2 shown in Table 1, actual values were used. FIGS. 7 to 12 are schematic views showing optical systems of optical devices corresponding to Design Examples 3-1 to 3-6. The values of coupling efficiency are calculated without any considerations to the reflection loss at interfaces and internal absorption loss, and loss caused by an optical function component placed between rod lenses. Single-mode fibers are used as optical fibers, and their numerical apertures (NA) are defined by the spread in a far-field where a Gaussian beam has an intensity of a maximum value of $1/e^2$.

TABLE 7

| | D. Ex. 3-1 | D. Ex. 3-2 | D. Ex. 3-3 |
|---|---|---|---|
| Outgoing-Side Fiber End Face Tilt $\theta_{FA}$ | 8.00° | 8.00° | 6.00° |
| Outgoing-Side Space $W_A$ | 0.146 mm | 0.466 mm | 0.0339 mm |
| Outgoing-Side Rod Lens End Face Tilt $\theta_{PA}$ | 8.00° | 0 | 8.00° |
| Outgoing-Side Rod Lens Length $Z_A$ | 4.4329 mm | 4.4329 mm | 4.4329 mm |
| Lens Interval L | 2.00 mm | 2.00 mm | 2.00 mm |
| Incident-Side Rod Lens Length $Z_B$ | 4.4329 mm | 4.4329 mm | 4.4329 mm |
| Incident-Side Rod Lens End Face Tilt $\theta_{PB}$ | 3.526° | 11.46° | 0.618° |
| Incident-Side Interval $W_B$ | 0.328 mm | 0.0033 mm | 0.4330 mm |
| Incident-Side Fiber End Face Tilt $\theta_{FB}$ | 8.00° | 8.00° | 6.00° |
| $\theta_{QA0}$ | 4.28° | 10.16° | 6.80° |
| $\theta_{QB0}$ | −3.79° | 10.51° | 6.50° |
| $(\theta_{QA} + \theta_{QB}) - (\theta_{QA0} + \theta_{QB0})$ | −4.90° | −0.35° | −0.30° |
| $\theta_{3A}$ | 0.27° | 0.86° | 0.05° |
| $\theta_{3B}$ | 0.60° | 0.01° | 0.60° |
| $\theta_{3A} - \theta_{3B}$ | −0.34° | 0.85° | −0.55° |
| Shift between Center Light Ray and Optical Axis ΔY | 0.00000mm | −0.00015mm | 0.00000mm |
| Tilt of Center Light Ray with respect to Optical Axis TLA | 0.000° | 0.000° | 0.000° |
| Coupling Efficiency | 0.9928 (−0.0314 dB) | 0.9887 (−0.049 dB) | 0.9912 (−0.038 dB) |

D. Ex. = Design Example

TABLE 8

| | D. Ex. 3-4 | D. Ex. 3-5 |
|---|---|---|
| Outgoing-Side Fiber End Face Tilt $\theta_{FA}$ | 4.00° | 8.00° |
| Outgoing-Side Interval $W_A$ | 0.0142mm | 0.030mm |
| Outgoing-Side Rod Lens End Face Tilt $\theta_{PA}$ | 4.00° | 5.20° |

TABLE 8-continued

| | D. Ex. 3-4 | D. Ex. 3-5 |
|---|---|---|
| Outgoing-Side Rod Lens Length $Z_A$ | 4.784 mm | 0.996 mm |
| Lens Interval L | 1.000 mm | 0.500 mm |
| Incident-Side Rod Lens Length $Z_B$ | 4.784 mm | 0.996 mm |
| Incident-Side Rod Lens End Face Tilt $\theta_{PB}$ | 2.008° | 5.20° |
| Incident-Side Interval $W_B$ | 0.0283 mm | 0.030 mm |
| Incident-Side Fiber End Face Tilt $\theta_{FB}$ | 4.00° | 8.00° |
| $\theta_{QA0}$ | 3.84° | 0.11° |
| $\theta_{QB0}$ | −3.82° | −0.11° |
| $(\theta_{QA} + \theta_{QB}) - (\theta_{QA0} + \theta_{QB0})$ | −0.02° | −0.22° |
| $\theta_{3A}$ | 0.01° | 0.27° |
| $\theta_{3B}$ | 0.02° | 0.27° |
| $\theta_{3A} - \theta_{3B}$ | −0.01° | 0.00° |
| Shift between Center Light Ray and Optical Axis ΔY | 0.00000mm | 0.00000mm |
| Tilt of Center Light Ray with respect to Optical Axis TLA | 0.000° | 0.000° |
| Coupling Efficiency | 0.9987 (−0.0054 dB) | 0.9909 (−0.039 dB) |

D. Ex. = Design Example

TABLE 9

| | D. Ex. 3-6 |
|---|---|
| Outgoing-Side Fiber End Face Tilt $\theta_{FA}$ | 6.00° |
| Outgoing-Side Interval $W_A$ | 0.0047 mm |
| Outgoing-Side Rod Lens End Face Tilt $\theta_{PA}$ | 6.00° |
| Outgoing-Side Rod Lens Length $Z_A$ | 4.3664 mm |
| Lens Interval L | 2.00 mm |
| Incident-Side Rod Lens Length $Z_B$ | 5.2000 mm |
| Incident-Side Rod Lens End Face Tilt $\theta_{PB}$ | −6.233° |
| Incident-Side Interval $W_B$ | 0.00465mm |
| Incident-Side Fiber End Face Tilt $\theta_{FB}$ | −6.00° |
| $\theta_{QA0}$ | 0.07° |
| $\theta_{QB0}$ | −0.07° |
| $\theta_{QA} - \theta_{QA0}$ | −0.07° |
| $\theta_{QB} - \theta_{QB0}$ | 0.07° |
| Shift between Center Light Ray and Optical Axis ΔY | 0.00054mm |
| Tilt of Center Light Ray with respect to Optical Axis TLA | −0.0001° |
| Coupling Efficiency | 0.9678 (−0.142 dB) |

Design Examples 3-1 to 3-4 and Reference Examples 1 and 2 according to the arrangement shown in FIG. 5 have the following common conditions:

the wavelength of light λ=1550 nm;

the material of the optical fibers is quartz (with a refractive index of 1.4440 in the wavelength of 1550 nm) and the numerical aperture NA of the optical fibers is 0.10;

the refractive index distribution of the rod lenses is expressed by $$n(r)^2 = n_0^2 \cdot \{1 - (g \cdot r)^2 + h_4 \cdot (g \cdot r)^4\},$$

$n_0 = 1.5901$,
$g = 0.326$ mm$^{-1}$, and
$h_4 = +0.67$;

the outer diameter 2 $r_0$ of the rod lenses is 1.8 mm; and $\theta_{QA}=\theta_{QB}=0$ holds.

In Design Examples 3-1 to 3-4, the shift $\Delta Y$ between the center light ray and the optical axis and the tilt TLA of the center light ray with respect to the optical axis are substantially 0, and therefore high coupling efficiency is obtained. However, in Reference Example 1, the condition of $0 \leq |\theta_{3A}-\theta_{3B}| \leq \pi/180$ is satisfied, but the path of the center light ray after entering the incident-side fiber does not coincide with the optical axis of the whole. Therefore, the absolute value of $(\theta_{QA}+\theta_{QB})-(\theta_{QA0}+\theta_{QB0})$ is large and thus the tilt TLA is great, resulting in poor coupling efficiency. In order to improve the coupling efficiency, it is required to correct the tilt TLA as in Reference Example 2.

Design Example 3-5 according to the arrangement shown in FIG. 5 satisfies the following conditions:

the wavelength of light $\lambda=1550$ nm;

the material of the optical fibers is quartz (with a refractive index of 1.4440 in the wavelength of 1550 nm) and the numerical aperture NA of the optical fibers is 0.10;

the refractive index distribution of the rod lenses is expressed by $$n(r)^2=n_0^2 \cdot \{1-(g \cdot r)^2+h_4 \cdot (g \cdot r)^4\},$$

$n_0=1.6600$,
$g=1.500$ mm$^{-1}$, and
$h_4=+0.67$;

the outer diameter 2 $r_0$ of the rod lenses is 1.0 mm; and $\theta_{QA}=\theta_{QB}=0$ holds.

Design Example 3-6 according to the arrangement shown in FIG. 6 satisfies the following conditions:

the wavelength of light $\lambda=1550$ nm;

the material of the optical fibers is quartz (with a refractive index of 1.4440 in the wavelength of 1550 nm) and the numerical aperture NA of the optical fibers is 0.10;

the refractive index distribution of the rod lenses is expressed by $$n(r)^2=n_0^2 \cdot \{1-(g \cdot r)^2+h_4 \cdot (g \cdot r)^4\},$$

$n_0=1.6600$,
$g=1.500$ mm$^{-1}$, and
$h_4=+0.67$;

the outer diameter 2 $r_0$ of the rod lenses is 0.50 mm; and $\theta_{QA}=\theta_{QB}=0$ holds.

In the above-mentioned design examples, even when light travels in the opposite direction and the outgoing side and the incident side are exchanged, the identical effects can be obtained.

As described above, the present invention allows the assembly and adjustment of an optical device having rod lenses to be simplified considerably, thus reducing the production cost.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical device, comprising:

an output fiber;

a first rod lens;

a second rod lens;

an input fiber; and an optical function element, the first rod lens converting a beam leaving an end face of the output fiber into a substantially parallel light ray, and after passing through the optical function element, the substantially parallel light ray being condensed by the second rod lens and then entering the input fiber, wherein optical axes of the output fiber, the first rod lens, the second rod lens, and the input fiber all coincide, a refractive index distribution of the first rod lens is expressed by $$n_A(r)^2=n_{0A}^2 \cdot \{1-(g_A \cdot r)^2+h_{4A}(g_A \cdot r)^4+h_{6A}(g_A \cdot r)^6+h_{8A}(g_A \cdot r)^8+\ldots\}, \quad \text{Eq. 55}$$

wherein r denotes a radial distance from the optical axis of the first rod lens, $n_{0A}$ a refractive index on the optical axis of the first rod lens, and $g_A$, $h_{4A}$, $h_{6A}$, and $h_{8A}$ refractive index distribution coefficients, a refractive index distribution of the second rod lens is expressed by $$n_B(r)=n_{0B}^2 \cdot \{1-(g_B \cdot r)^2+h_{4B}(g_B \cdot r)^4+h_{6B}(g_B \cdot r)^6+h_{8B}(g_B \cdot r)^8+\ldots\}, \quad \text{Eq. 56}$$

wherein r denotes a radial distance from the optical axis of the second rod lens, $n_{0B}$ a refractive index on the optical axis of the second rod lens, and $g_B$, $h_{4B}$, $h_{6B}$, and $h_{8B}$ refractive index distribution coefficients, a relationship of $$\theta_{FA} \cdot \theta_{FB} > 0 \quad \text{Eq. 57}$$

is satisfied, wherein $\theta_{FA}$ indicates an angle between a line normal to an outgoing face of the output fiber and an optical axis of the optical device as a whole and $\theta_{FB}$ denotes an angle between a line normal to an incident face of the input fiber and the optical axis of the optical device as a whole, when $\theta_{3A}$ and $\theta_{3B}$ are defined by $$\theta_{3A}=n_{0A} \cdot g_A \cdot W_A \cdot (n_{FA}-n_{LA})\theta_{FA}/(n_M \cdot n_{LA})+(n_M-n_{0A}) \cdot \theta_{QA}/n_M \quad \text{Eq. 58}$$

and $$\theta_{3B}=n_{0B} \cdot g_B \cdot W_B \cdot (n_{FB}-n_{LB})\theta_{FB}/(n_M \cdot n_{LB})+(n_M-n_{0B}) \cdot \theta_{QB}/n_M, \quad \text{Eq. 59}$$

wherein $n_{FA}$ indicates a core-center refractive index of the output fiber, $n_{FB}$ a core-center refractive index of the input fiber, $W_A$ an interval between the output fiber and the first rod lens, $W_B$ an interval between the second rod lens and the input fiber, $n_{LA}$ a refractive index of a medium between the output fiber and the first rod lens, $n_{LB}$ a refractive index of a medium between the second rod lens and the input fiber, $n_M$ a refractive index of a medium between the first rod lens and the second rod lens, $\theta_{QA}$ an angle between a line normal to an outgoing face of the first rod lens and the optical axis of the optical device as a whole, and $\theta_{QB}$ an angle between a line normal to an incident face of the second rod lens and the optical axis of the optical device as a whole, $\theta_{3A}$ and $\theta_{3B}$ satisfy $$0 \leq |\theta_{3A}-\theta_{3B}| \leq \pi/180 \quad \text{Eq. 60}$$

and relationships of $$0 \leq |\theta_{PA}| \leq 15 \cdot (\pi/180) \quad \text{Eq. 61}$$

and $$0 \leq |\theta_{PB}| \leq 15 \cdot (\pi/180) \quad \text{Eq. 62}$$

are satisfied, wherein $\theta_{PA}$ denotes an angle between a line normal to an incident face of the first rod lens and the optical axis of the optical device as a whole, and $\theta_{PB}$ an angle between a line normal to an outgoing face of the second rod lens and the optical axis of the optical device as a whole.

2. The optical device according to claim 1, wherein when $\theta_{QA0}$ and $\theta_{QB0}$ are defined by $$\theta_{QA0} = \{(0.5 \cdot n_{0A}^2 \cdot g_A^2 \cdot L \cdot W_A - n_{LA} \cdot n_M) \cdot (n_{FA} - n_{LA}) \theta_{FA} + n_{LA} \cdot n_M) n_{0A} - n_{LA}) \cdot \theta_{PA}\}/\{0.5 \cdot n_{0A} \cdot n_{LA} \cdot g_A \cdot L \cdot (n_{0A} - n_M)\} \qquad \text{Eq. 63}$$

in the case of L>0 and $\theta_{QA0} = 0$ in the case of L>0 and $$\theta_{QB0} = \{(0.5 \cdot n_{0B}^2 \cdot g_B^2 \cdot L \cdot W_B - n_{LB} \cdot n_M) \cdot (n_{FB} - n_{LB}) \theta_{FB} + n_{LB} \cdot n_M (n_{0B} - n_{LB}) \cdot \theta_{PB}\}/\{0.5 \cdot n_{0B} \cdot n_{LB} \cdot g_B \cdot L \cdot (n_{0B} - n_M)\} \qquad \text{Eq. 64}$$

in the case of L>0 and $\theta_{QB0} = 0$ in the case of L=0, wherein L denotes an interval between the first rod lens and the second rod lens on the optical axis of the optical device as a whole, a relationship of $$-2.5 \cdot (\pi/180) \leq (\theta_{QA} + \theta_{QB}) - (\theta_{QA0} + \theta_{QB0}) \leq +2.5 \cdot (\pi/180) \qquad \text{Eq. 65}$$

is satisfied, wherein $\theta_{QA}$ denotes an angle between a line normal to an outgoing face of the first rod lens and the optical axis of the optical device as a whole, and $\theta_{QB}$ indicates an angle between a line normal to an incident face of the second rod lens and the optical axis of the optical device as a whole.

3. The optical device according to claim 1, wherein a path of a light ray at a symmetrical center of light intensity distribution of a beam leaving the output fiber coincides with the optical axis of the optical device as a whole after the light ray enters the input fiber.

4. The optical device according to claim 1, wherein a relationship of $1.4 \leq n_0 \leq 2.0$ is satisfied.

5. The optical device according to claim 1, wherein a relationship of $1.4 \leq n_{0B} \leq 2.0$ is satisfied.

6. The optical device according to claim 1, wherein a relationship of $0.125 \text{ mm} \leq 2 r_{0A} \leq 5 \text{ mm}$ is satisfied, where $r_{0A}$ indicates a radius of the first rod lens.

7. The optical device according to claim 1, wherein a relationship of $0.125 \text{ mm} \leq 2 r_{0B} \leq 5 \text{ mm}$ is satisfied, where $r_{0B}$ indicates a radius of the second rod lens.

8. The optical device according to claim 1, wherein a relationship of $0.1 \leq n_{0A} \cdot g_A \cdot r_{0A} \leq 1$ is satisfied.

9. The optical device according to claim 1, wherein a relationship of $0.1 \leq n_{0B} \cdot g_B \cdot r_{0B} \leq 1$ is satisfied.

10. The optical device according to claim 1, wherein a relationship of $4 \cdot (\pi/180) \leq |\theta_{FA}| \leq 15 \cdot (\pi/180)$ is satisfied.

11. The optical device according to claim 1, wherein a relationship of $4 \cdot (\pi/180) \leq |\theta_{FB}| \leq 15 \cdot (\pi/180)$ is satisfied.

12. The optical device according to claim 10, wherein a relationship of $6 \cdot (\pi/180) \leq |\theta_{FA}| \leq 8 \cdot (\pi/180)$ is satisfied.

13. The optical device according to claim 11, wherein a relationship of $6 \cdot (\pi/180) \leq |\theta_{FA}| \leq 8 \cdot (\pi/180)$ is satisfied.

14. The optical device according to claim 1, wherein a relationship of $g_A \cdot W_A \leq 0.2$ is satisfied.

15. The optical device according to claim 1, wherein a relationship of $g_B \cdot W_B \leq 0.2$ is satisfied.

16. The optical device according to claim 1, wherein a relationship of $|\theta_{FA}| = |\theta_{FB}|$ is satisfied.

17. The optical device according to claim 1, wherein a relationship of $n_{LA} = n_{LB}$ is satisfied.

18. The optical device according to claim 17, wherein a relationship of $n_{LA} = n_{LB} = 1$ is satisfied.

19. The optical device according to claim 1, wherein relationships of $n_{0A} = n_{0B}$, $g_A = g_B$, and $r_{0A} = r_{0B}$ are satisfied.

20. The optical device according to claim 1, wherein a relationship of $\theta_{PA} = \theta_{PB}$ is satisfied.

21. The optical device according to claim 1, wherein a relationship of $n_{FA} = n_{FB}$ is satisfied.

22. An optical device, comprising:

an output fiber;

a first rod lens;

a second rod lens;

an input fiber; and an optical function element, the first rod lens converting a beam leaving an end face of the output fiber into a substantially parallel light ray, and after passing through the optical function element, the substantially parallel light ray being condensed by the second rod lens and then entering the input fiber, wherein optical axes of the output fiber, the first rod lens, the second rod lens, and the input fiber all coincide, a refractive index distribution of the first rod lens is expressed by $$n_A(r)^2 = n_{0A}^2 \cdot \{1 - (g_A \cdot r)^2 + h_{4A}(g_A \cdot r)^4 + h_{6A}(g_A \cdot r)^6 + h_{8A}(g_A \cdot r)^8 + \ldots \}, \qquad \text{Eq. 66}$$

wherein r denotes a radial distance from the optical axis of the first rod lens, $n_{0A}$ a refractive index on the optical axis of the first rod lens, $g_A$, $h_{4A}$, $h_{6A}$, and $h_{8A}$ refractive index distribution coefficients, a refractive index distribution of the second rod lens is expressed by $$n_B(r)^2 = n_{0B}^2 \cdot \{1 - (g_B \cdot r)^2 + h_{4B}(g_A \cdot r)^4 + h_{6B}(g_B \cdot r)^6 + h_{8B}(g_B \cdot r)^8 + \ldots \}, \qquad \text{Eq. 67}$$

wherein r denotes a radial distance from the optical axis of the second rod lens, $n_{0B}$ a refractive index on the optical axis of the second rod lens, and $g_B$, $h_{4B}$, $h_{6B}$, and $h_{8B}$ refractive index distribution coefficients, a relationship of $$\theta_{FA} \cdot \theta_{FB} < 0 \qquad \text{Eq. 68}$$

is satisfied, wherein $\theta_{FA}$ indicates an angle between a line normal to an outgoing face of the output fiber and an optical axis of the optical device as a whole and $\theta_{FB}$ denotes an angle between a line normal to an incident face of the input fiber and the optical axis of the optical device as a whole, when $\theta_{QA0}$ and $\theta_{QB0}$ are defined by $$\theta_{QA0} = n_{0A} \cdot g_A \cdot W_A \cdot (n_{0A} - n_{LA}) \cdot \theta_{PA} / \{n_{LA} \cdot (n_{0A} - n_m)\} \qquad \text{Eq. 69}$$

and $$\theta_{QA0} = n_{0B} \cdot g_B \cdot W_B \cdot (n_{0B} - n_{LB}) \cdot \theta_{PB} / \{n_{LB} \cdot (n_{0B} - n_M)\}, \qquad \text{Eq. 70}$$

wherein if $n_{0A} - n_M = 0$, $\theta_{QA0} = 0$, and if $n_{0B} - n_M = 0$, $\theta_{QB0} = 0$, and $n_{FA}$ indicates a core-center refractive index of the output fiber, $n_{FB}$ a core-center refractive index of the input fiber, $W_A$ an interval between the output fiber and the first rod lens, $W_B$ an interval between the second rod lens and the input fiber, $n_{LA}$ a refractive index of a medium between the output fiber and the first rod lens, $n_{LB}$ a refractive index of a medium between the second rod lens and the input fiber, $n_M$ a refractive index of a medium between the first rod lens and the second rod lens, $\theta_{PA}$ an angle between a line normal to an incident face of the first rod lens and the optical axis of the optical device as a whole, and $\theta_{PB}$ an angle between a line normal to an outgoing face of the second rod lens and the optical axis of the optical device as a whole, relationships of $$-(\pi/180) \leq \theta_{QA} - \theta_{QA0} \leq (\pi/180) \qquad \text{Eq. 71}$$

and $$-(\pi/180) \leq \theta_{QB} - \theta_{QB0} \leq (\pi/180) \qquad \text{Eq. 72}$$

are satisfied, wherein $\theta_{QA}$ denotes an angle between a line normal to an outgoing face of the first rod lens and the optical axis of the optical device as a whole, and $\theta_{QB}$ indicates an angle between a line normal to an incident face of the second rod lens and the optical axis of the optical device as a whole, and $\theta_{PA}$ and $\theta_{PB}$ satisfy $$0 \leq |\theta_{PA}| \leq 15 \cdot (\pi/180) \qquad \text{Eq. 73}$$

and $$0 \leq |\theta_{PB}| \leq 15 \cdot (\pi/180). \qquad \text{Eq. 74}$$

23. The optical device according to claim 22, wherein a path of a light ray at a symmetrical center of light intensity distribution of a beam leaving the output fiber coincides with the optical axis of the optical device as a whole after the light ray enters the input fiber.

24. The optical device according to claim 22, wherein a relationship of $1.4 \leq n_{OA} \leq 2.0$ is satisfied.

25. The optical device according to claim 22, wherein a relationship of $1.4 \leq n_{OB} \leq 2.0$ is satisfied.

26. The optical device according to claim 22, wherein a relationship of $0.125 \text{ mm} \leq 2 r_{OA} \leq 5 \text{ mm}$ is satisfied, where $r_{OA}$ indicates a radius of the first rod lens.

27. The optical device according to claim 22, wherein a relationship of $0.125 \text{ mm} \leq 2 r_{OB} \leq 5 \text{ mm}$ is satisfied, where $r_{OB}$ indicates a radius of the second rod lens.

28. The optical device according to claim 22, wherein a relationship of $0.1 \leq n_{OA} \cdot g_A \cdot r_{OA} \leq 1$ is satisfied.

29. The optical device according to claim 22, wherein a relationship of $0.1 \leq n_{OB} \cdot g_B \cdot r_{OB} \leq 1$ is satisfied.

30. The optical device according to claim 22, wherein a relationship of $4 \cdot (\pi/180) \leq |\theta_{FA}| \leq 15 \cdot (\pi/180)$ is satisfied.

31. The optical device according to claim 22, wherein a relationship of $4 \cdot (\pi/180) \leq |\theta_{FB}| \leq 15 \cdot (\pi/180)$ is satisfied.

32. The optical device according to claim 30, wherein a relationship of $6 \cdot (\pi/180) \leq |\theta_{FA}| \leq 8 \cdot (\pi/180)$ is satisfied.

33. The optical device according to claim 31, wherein a relationship of $6 \cdot (\pi/180) \leq |\theta_{FB}| \leq 8 \cdot (\pi/180)$ is satisfied.

34. The optical device according to claim 22, wherein a relationship of $g_A \cdot W_A \leq 0.2$ is satisfied.

35. The optical device according to claim 22, wherein a relationship of $g_B \cdot W_B \leq 0.2$ is satisfied.

36. The optical device according to claim 22, wherein a relationship of $|\theta_{FA}| = |\theta_{FB}|$ is satisfied.

37. The optical device according to claim 22, wherein a relationship of $n_{LA} = n_{LB}$ is satisfied.

38. The optical device according to claim 37, wherein a relationship of $n_{LA} = n_{LB} = 1$ is satisfied.

39. The optical device according to claim 22, wherein relationships of $n_{OA} = n_{OB}$, $g_A = g_B$, and $r_{OA} = r_{OB}$ are satisfied.

40. The optical device according to claim 22, wherein a relationship of $\theta_{PA} = -\theta_{PB}$ is satisfied.

41. The optical device according to claim 22, wherein a relationship of $n_{FA} = n_{FB}$ is satisfied.

42. The optical device according to claim 22, wherein a relationship of $\theta_{PA} \theta_{PB} = 0$ is satisfied.

43. The optical device according to claim 22, wherein relationships of $\theta_{FA} = \theta_{PA}$ and $\theta_{FB} = \theta_{PB}$ are satisfied.

* * * * *